(12) United States Patent
Iga et al.

(10) Patent No.: US 7,184,592 B2
(45) Date of Patent: Feb. 27, 2007

(54) INFORMATION PROCESSING APPARATUS, METHOD OF CONTROLLING THE SAME, AND PROGRAM FOR CAUSING A COMPUTER TO EXECUTE SUCH A METHOD

(75) Inventors: Soichiro Iga, Tokyo (JP); Katsuyuki Omura, Tokyo (JP)

(73) Assignee: Ricoh Company, Ltd., Tokyo (JP)

( * ) Notice: Subject to any disclaimer, the term of this patent is extended or adjusted under 35 U.S.C. 154(b) by 810 days.

(21) Appl. No.: 10/246,652

(22) Filed: Sep. 19, 2002

(65) Prior Publication Data

US 2003/0128244 A1  Jul. 10, 2003

(30) Foreign Application Priority Data

Sep. 19, 2001 (JP) .............................. 2001-285955
Aug. 29, 2002 (JP) .............................. 2002-251864

(51) Int. Cl.
*G06K 9/00* (2006.01)

(52) U.S. Cl. ...................... 382/188; 382/189; 345/179

(58) Field of Classification Search ................ 382/188, 382/189; 345/179
See application file for complete search history.

(56) References Cited

U.S. PATENT DOCUMENTS

| | | |
|---|---|---|
| 5,161,113 A | 11/1992 | Omura |
| 5,208,874 A | 5/1993 | Omura |
| 5,218,558 A | 6/1993 | Omura |
| 6,292,181 B1 * | 9/2001 | Banerjee et al. ............ 345/179 |
| 6,333,995 B1 * | 12/2001 | Perrone ...................... 382/187 |
| 6,421,042 B1 | 7/2002 | Omura et al. |
| 6,429,856 B1 | 8/2002 | Omura et al. |
| 6,587,587 B2 * | 7/2003 | Altman et al. .............. 382/181 |
| 6,628,847 B1 * | 9/2003 | Kasabach et al. ........... 382/314 |
| 6,647,145 B1 * | 11/2003 | Gay .......................... 382/187 |
| 6,839,464 B2 * | 1/2005 | Hawkins et al. ............ 382/187 |
| 6,889,365 B2 * | 5/2005 | Okahara et al. ............ 715/858 |
| 6,952,497 B1 * | 10/2005 | Hollstrom et al. ......... 382/188 |

FOREIGN PATENT DOCUMENTS

| | | |
|---|---|---|
| JP | 7-113871 | 12/1995 |
| JP | 08-286831 | 11/1996 |
| JP | 2627407 | 4/1997 |

OTHER PUBLICATIONS

English Translation of the related part of "Pattern Recognition" by Kenichi Mori et al., The Institute of Electronics, Information and Communication Engineers (IEICE) (1993), pp. 173, line 8-18.
"Algorithm" http://www5d.biglobe.ne.jp/-tomoya03/shtmal/algorithm/Hougan.htm, 7 pages.

* cited by examiner

*Primary Examiner*—Bhavesh M. Mehta
*Assistant Examiner*—John Strege
(74) *Attorney, Agent, or Firm*—Oblon, Spivak, McClelland, Maier & Neustadt, P.C.

(57) ABSTRACT

An information processing apparatus includes a command region determination part determining a command region based on a stroke formed by an array of points indicated by coordinates input to a predetermined plane and a data transmission part transmitting, to the outside, data determined based on the input timing and the arrays of coordinates in the command region.

59 Claims, 27 Drawing Sheets

FIG.13
| STROKE SHAPE | GESTURE ID | CORRESPONDING COMMAND |
|---|---|---|
| 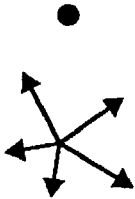 | 0 | MOUSE CLICK<br>MOUSE_CLICK |
|  | 1 | MOUSE CURSOR MOVE<br>MOUSE_MOVE |
|  | 2 | MOUSE BUTTON DOWN<br>MOUSE_DOWN |
|  | 3 | MOUSE BUTTON UP<br>MOUSE_UP |
|  | 4 | RIGHTWARD ARROW→KEY<br>KEY_ARROW_RIGHT |
| 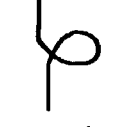 | 5 | LEFTWARD ARROW←KEY<br>KEY_ARROW_LEFT |
| 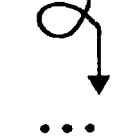 | 6 | UPWARD ARROW ↑ KEY<br>KEY_ARROW_UP |
| | 7 | DOWNWARD ARROW ↓ KEY<br>KEY_ARROW_DOWN |
| ... | ... | ... |

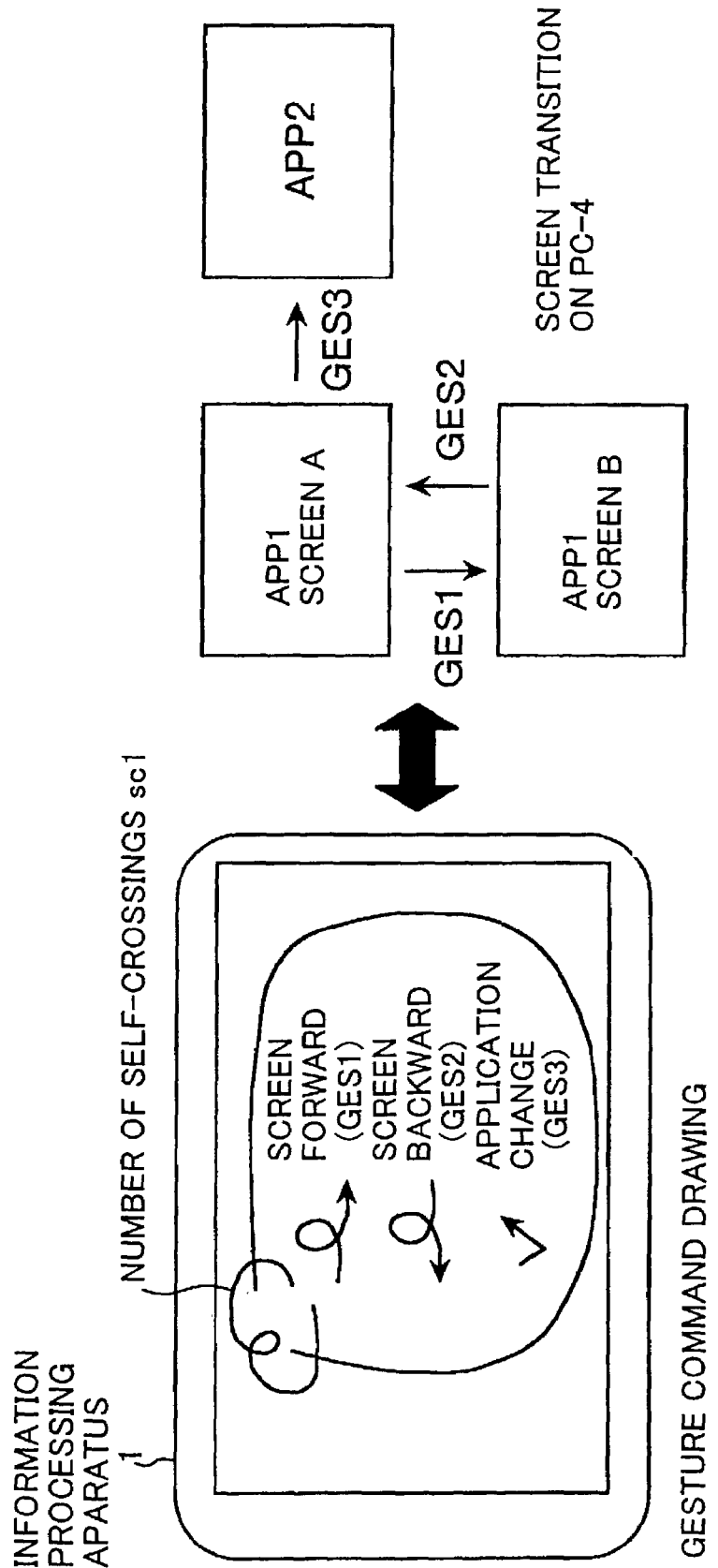

GESTURE COMMAND DRAWING

1a INFORMATION PROCESSING APPARATUS

INFORMATION PROCESSING APPARATUS

INFORMATION PROCESSING APPARATUS

INFORMATION PROCESSING APPARATUS, METHOD OF CONTROLLING THE SAME, AND PROGRAM FOR CAUSING A COMPUTER TO EXECUTE SUCH A METHOD

BACKGROUND OF THE INVENTION

1. Field of the Invention

The present invention generally relates to information processing apparatuses, methods of controlling the same, and programs for causing a computer to execute such methods, and more particularly to an information processing apparatus for transmitting stroke information or a command input from an input device to another apparatus, a method of controlling such an information processing apparatus, and a program for causing a computer to execute such a method.

2. Description of the Related Art

In recent years, electronic information equipment has been commonly used in conferences and presentations. A large number of conference support apparatuses using coordinate input devices having electrical mechanisms, such as electronic blackboard apparatuses, have been proposed to replace the conventional black board. However, users of those apparatuses do not necessarily have knowledge of electronic information equipment. Therefore, it is important to increase the operability of those apparatuses at the time of their use.

Japanese Published Examined Patent Application No. 7-113871 proposes specifying an editing type by drawing an image while pressing down a function key provided on the instruction device side as a method of increasing editing operability in inputting coordinates.

Further, Japanese Patent No. 2627407 discloses a method of processing handwritten input information by which method a graphic segment to be edited and an editing pattern are specified by handwritten input graphics so that graphic editing can be performed in a process similar to that of conventional graphic editing on a sheet of paper.

The above-described conventional methods, however, require a function switch for editing, such as a special switch device or a substitute switch of a mouse button or a keyboard, in order to discriminate between a graphic or character drawing and an editing command.

Operation of such a function switch is complicated to users having only insufficient knowledge of electronic information equipment, so that a conference or presentation using a coordinate input device or an electronic blackboard apparatus may be prevented from proceeding smoothly. Accordingly, users are requesting that the coordinate input device and the electronic blackboard apparatus be provided with improved operability.

In order to simplify information inputting in a coordinate input device and increase its operability, reuse of already input information is considered. Japanese Laid-Open Patent Application No. 8-286831, for instance, discloses a technique for reusing information input in the past. According to the configuration disclosed therein, a gesture display region where information input in the past is displayed is provided separately from an object region where an object for operation is displayed. An operator selects a command displayed in the gesture display region. The operator then drags and drops the command onto the object displayed in the object region so that the command is reapplied to the object. With respect to the operation of reusing the input information, however, a more simple operation than "drag-and-drop" is desired.

Further, basically, the conventional methods are based on a coordinate input device including a display unit. Therefore, the conventional methods are not applicable to an apparatus without a display unit, such as an electronic blackboard apparatus, which only includes a coordinate input device. Further, the conventional methods do not include a mechanism for transmitting drawn data as a command. Accordingly, only drawing information, but not command information, can be shared between different apparatuses. Therefore, in a conference or presentation, where a plurality of electronic information apparatuses are supposed to be used, the convenience of the electronic information apparatuses is dramatically decreased.

SUMMARY OF THE INVENTION

Accordingly, it is a general object of the present invention to provide an information processing apparatus in which the above-described disadvantages are eliminated, a method of controlling such an information apparatus, and a program for causing a computer to execute such a method.

A more specific object of the present invention is to provide an information processing apparatus that realizes the function of sharing drawing information and the function of transmitting command information and includes a user interface of good operability while taking advantage of the touch of conventional pen writing on a blackboard or whiteboard, a method of controlling such an information processing apparatus, and a program for causing a computer to execute such a method.

The above objects of the present invention are achieved by an information processing apparatus including a command region determination part determining a command region based on a stroke formed by an array of points indicated by coordinates input to a predetermined plane and a data transmission part transmitting, to outside, data determined based on input timing and arrays of coordinates in the command region.

According to the above-described information processing apparatus, the command region can be determined by making a drawing on the predetermined plane, and data can be transmitted outside by inputting coordinates to the command region. Thereby, data can be transmitted to an external apparatus without using function switches for editing, such as a special switch device or a substitute switch of a mouse button or keyboard. This increases the operability of the information processing apparatus for an operator who is not accustomed to operating electronic information equipment. This also enables data to be shared among a plurality of apparatuses.

The above objects of the present invention are also achieved by a method of controlling an information processing apparatus, including the steps of (a) determining a command region based on a stroke formed by arranging coordinates specified on a predetermined plane and (b) transmitting, to outside, data determined based on input timing and arrays of coordinates detected in the command region.

The above-described method suitably controls the information processing apparatus of the present invention.

The above objects of the present invention are also achieved by a program product for causing a computer to execute a method of controlling an information processing apparatus, the method including the steps of (a) determining a command region based on a stroke formed by arranging coordinates specified on a predetermined plane and (b)

transmitting, to outside, data determined based on input timing and arrays of coordinates detected in the command region.

The above objects of the present invention are also achieved by a computer-readable recording medium storing a program for causing a computer to execute a method of controlling an information processing apparatus, the method including the steps of (a) determining a command region based on a stroke formed by arranging coordinates specified on a predetermined plane and (b) transmitting, to outside, data determined based on input timing and arrays of coordinates detected in the command region.

BRIEF DESCRIPTION OF THE DRAWINGS

Other objects, features and advantages of the present invention will become more apparent from the following detailed description when read in conjunction with the accompanying drawings, in which:

FIG. 13 is a table that is an embodiment of a gesture table storage part of the information processing apparatus of FIG. 1;

FIG. 18 is a diagram for illustrating an operation of a PC of FIG. 17 in the case of drawing a gesture command according to the first embodiment of the present invention;

DETAILED DESCRIPTION OF THE PREFERRED EMBODIMENTS

A description will now be given, with reference to the accompanying drawings, of embodiments of the present invention.

[First Embodiment]

Figure 1:
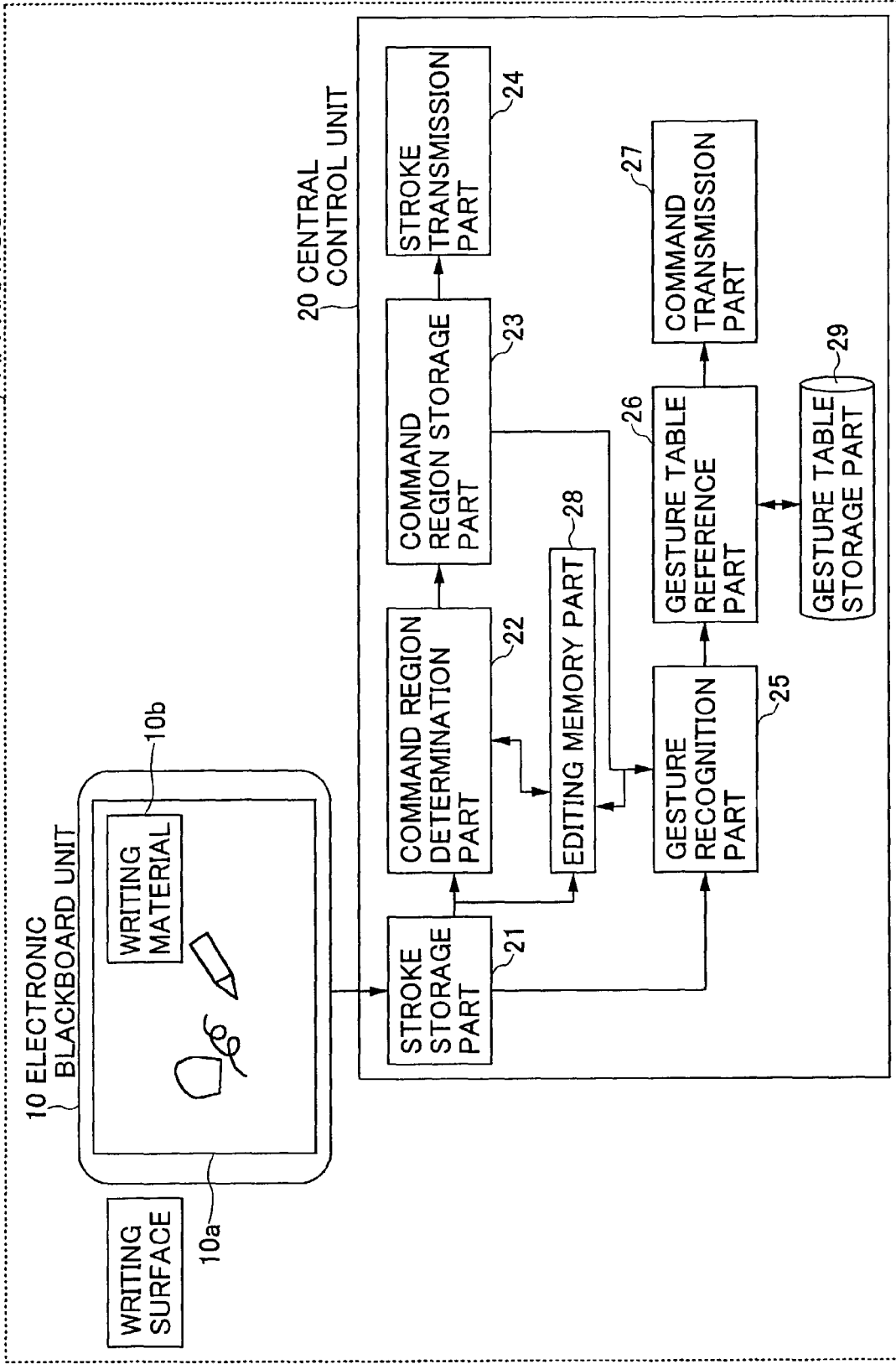
FIG. 1 is a block diagram showing the configuration of an information processing apparatus according to a first embodiment of the present invention.

FIG. 1 is a block diagram showing the configuration of an information processing apparatus 1 according to a first embodiment of the present invention. The information processing apparatus 1 includes an electronic blackboard unit 10 and a central control unit 20. The central control unit 20 includes a stroke storage part 21 storing strokes input from the electronic blackboard unit 10, a command region determination part 22 checking the relationship between strokes and determining each stroke to be a command region or a tag region, a command region storage part 23 storing stroke data in the command region, a stroke transmission part 24 transmitting stroke data to a destination specified by the tag region, a gesture recognition part 25 obtaining the features of a stroke drawn in the command region and determining the stroke as a gesture, a gesture table reference part 26 referring to a gesture table storage part 29 for a command corresponding to the gesture, a command transmission part 27 transmitting the command to the destination specified by the tag region, an editing memory part 28 temporarily storing stroke data for determining the command or tag region and counting the number of self-crossings of a stroke, and the gesture table storage part 29 storing gestures and their respective corresponding commands.

The electronic blackboard unit 10 includes a writing surface 10a to the bottom side of which pressure detection sensors are provided in a matrix-like manner. The pressure detection sensors detect a position where a writing material 10b such as a marker pen contacts the writing surface 10a, and outputs the position to the central control unit 20 through RS-232-C serial communication.

A description will be given of the stroke storage part 21. A drawing by the writing material 10b is detected by the pressure detection sensors on the electronic blackboard unit 10 as two-dimensional coordinates (x, y) in real time at a constant sampling frequency when the writing material 10b contacts the writing surface 10a of the electronic blackboard unit 10. When the writing material 10b is released from the writing surface 10a of the electronic blackboard unit 10, the coordinate detection stops.

The coordinate values obtained at the sampling frequency during the period from when the writing material 10b contacts the writing surface 10a of the electronic blackboard unit 10 to when the writing material 10b is released from the writing surface 10a are successively stored in the stroke storage part 21 of the central control unit 20 as coordinate value arrays X[n] and Y[n]. Here, X and Y are arrays storing the coordinate values, and n is the number of sampled coordinate points, indicating the index number of each of the X and Y arrays. The coordinate values are stored in the arrays in the order sampled. The arrays of the coordinate values stored during the above-described period are referred to as a stroke.

The stroke is stored in the stroke storage part 21 of the central control unit 20 every time the writing material 10b contacts and then is released from the writing surface 10a of the electronic blackboard unit 10, so that a plurality of strokes are successively stored in the stroke storage part 21 as a stroke array ST[M]. Here, M is the maximum number of elements (strokes) in the stroke array. Storage of strokes is realized in the following manner when expressed in the C language structure:

```
struct stroke{
    int X[N];
    int Y[N];
    int n;
}ST[M];
``` where ST is the stroke array, M is the maximum number of elements in the stroke array to be stored, N is the maximum number of coordinate points, and n is the number of coordinate points sampled in each stroke and falls in the range of 1 to N.

The stroke array may optionally store information on time, such as date or time of stroke drawing or a time difference between stroke drawings, as data. For instance, storage of such information can be expressed as follows in the C language structure:

```
struct stroke{
    int X[N];
    int Y[N];
    int n;
        long time
}ST[M];
```

Time information on when the starting point (X[1], Y[1]) of a stroke is input may be stored in the variable "time", for instance. Time information may be acquired, for instance, by obtaining date and time from a timer, but is not always required in a data structure.

A description will be given of the command region determination part 22. According to the present invention, the function of transmitting drawings and the function of transmitting commands are realized by two strokes of specific attributes indicating the command region and the tag region, respectively.

When two successive strokes stored in the stroke storage part 21 satisfy predetermined conditions, the two strokes are determined to be the command region and the tag region, respectively. The command region has the function of transmitting drawing information or a command to a terminal connected to the network, and the tag region has the function of retaining the attribute information (information specifying a destination to which the drawing information or command is transmitted) of the command region.

Figure 2:
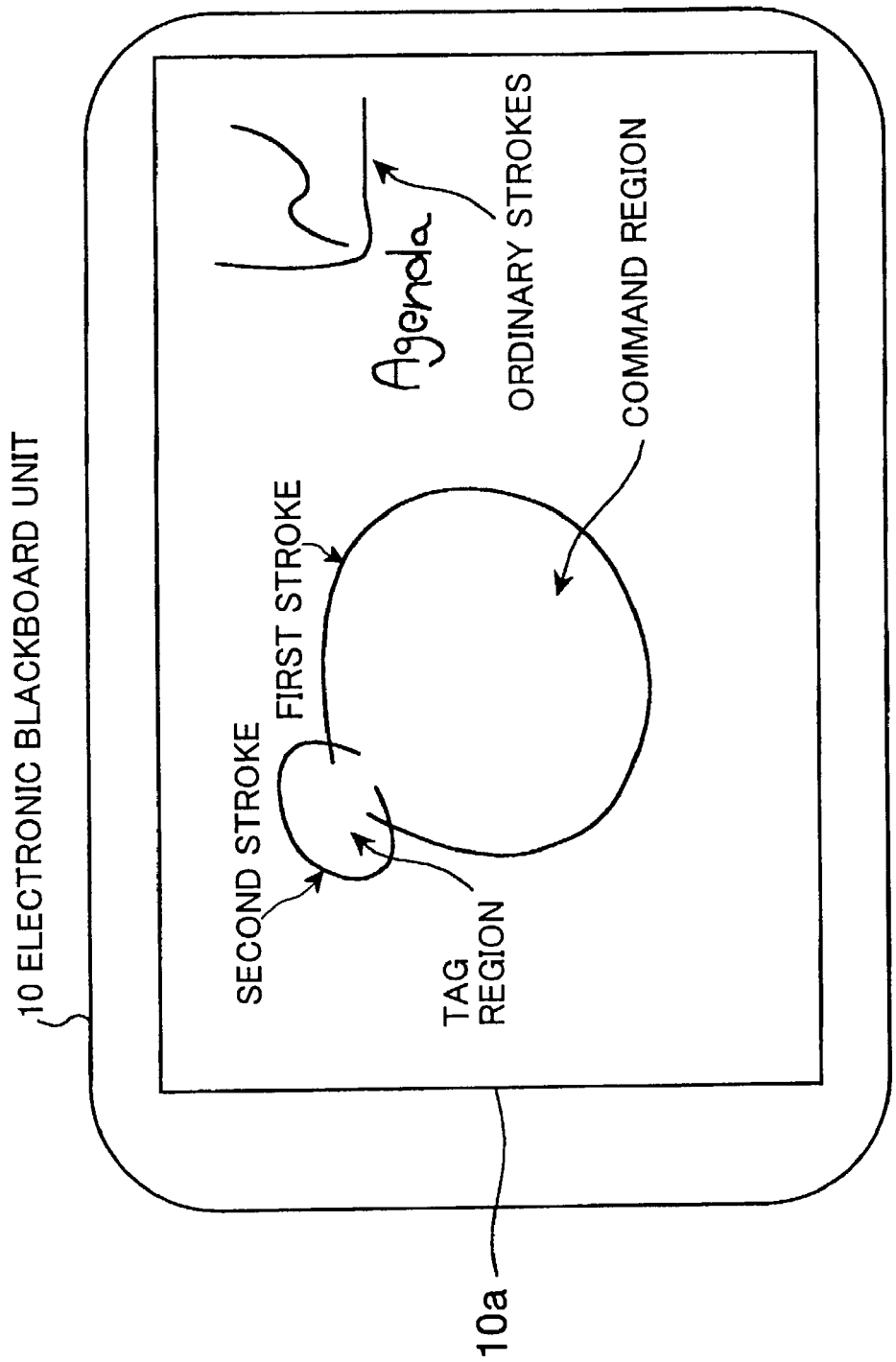
FIG. 2 is a diagram showing a writing surface of an electronic blackboard unit of the information processing apparatus of FIG. 1 on which writing surface a command region, a tag region, and ordinary strokes are drawn.

FIG. 2 is a diagram showing the writing surface 10a of the electronic blackboard unit 10 on which the command region, the tag region, and ordinary strokes are drawn. With two successive strokes being defined as first and second strokes, the closed region part of the first stroke is determined to be the command region and the closed region part of the second stroke is determined to be the tag region when the two successive strokes satisfy the predetermined conditions.

The existing stroke data (drawing information) is transmitted to an apparatus specified by the shape of a stroke in the tag region, and a stroke input in the command region thereafter is converted to a command and transmitted to the apparatus specified by the shape of the stroke in the tag region.

A description will be given of the conditions for determining the command and tag regions.

Figure 3:
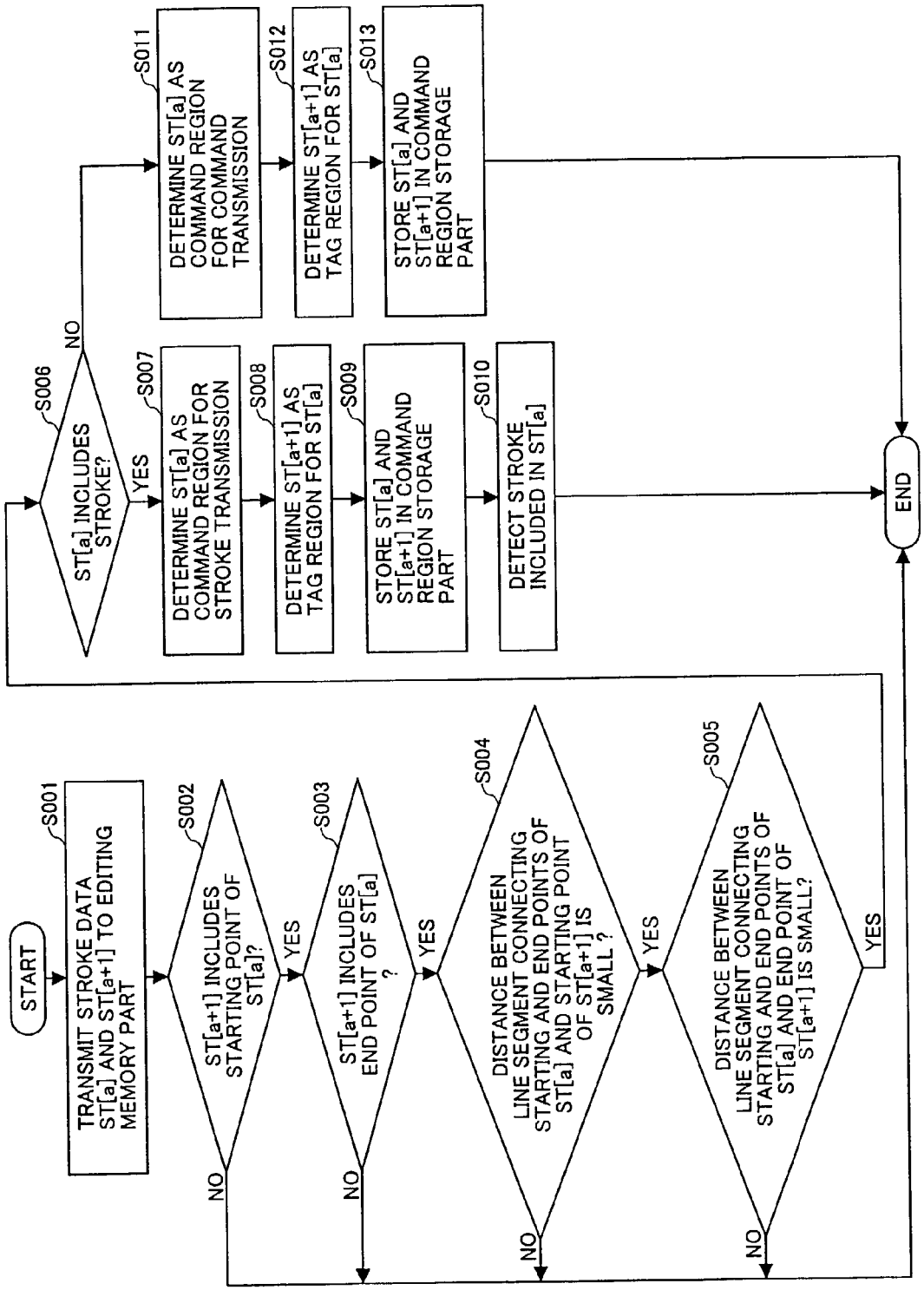
FIG. 3 is a flowchart of the operation of a command region determination part of the information processing apparatus of FIG. 1.

FIG. 3 is a flowchart of the operation of the command region determination part 22. An expatiation on individual operations such as stroke transmission and command transmission will be given later.

Here, two successive strokes in a stroke array stored in the stroke storage part 21 of the central control unit 20 are defined as a first stroke ST[a] and a second stroke ST[a+1], respectively, in which "a" indicates a stroke number at any point stored in the stroke storage part 21 and takes values ranging from 1 to M. Further, of the coordinate values constituting the first stroke ST[a], the kth coordinate values are referred to by ST[a].X[k], ST[a].Y[k].

In step S001 of FIG. 3, when the first and second strokes ST[a] and ST[a+1] are stored in the stroke storage part 21 of the central control unit 20, data on the first and second strokes ST[a] and ST[a+1] are transmitted to the editing memory part 28, so that the operation of determining the command and tag regions is started.

In step S002, it is determined whether the closed region part of the second stroke ST[a+1] includes the starting point (ST[a].X[1], ST[a].Y[1]) of the first stroke ST[a].

If it is determined in step S002 that the closed region part of the second stroke ST[a+1] includes the starting point (ST[a].X[1], ST[a].Y[1]) of the first stroke ST[a], next, in step S003, it is determined whether the closed region part of the second stroke ST[a+1] includes the end point (ST[a].X[n], ST[a].Y[n]) of the first stroke ST[a].

Figure 4:
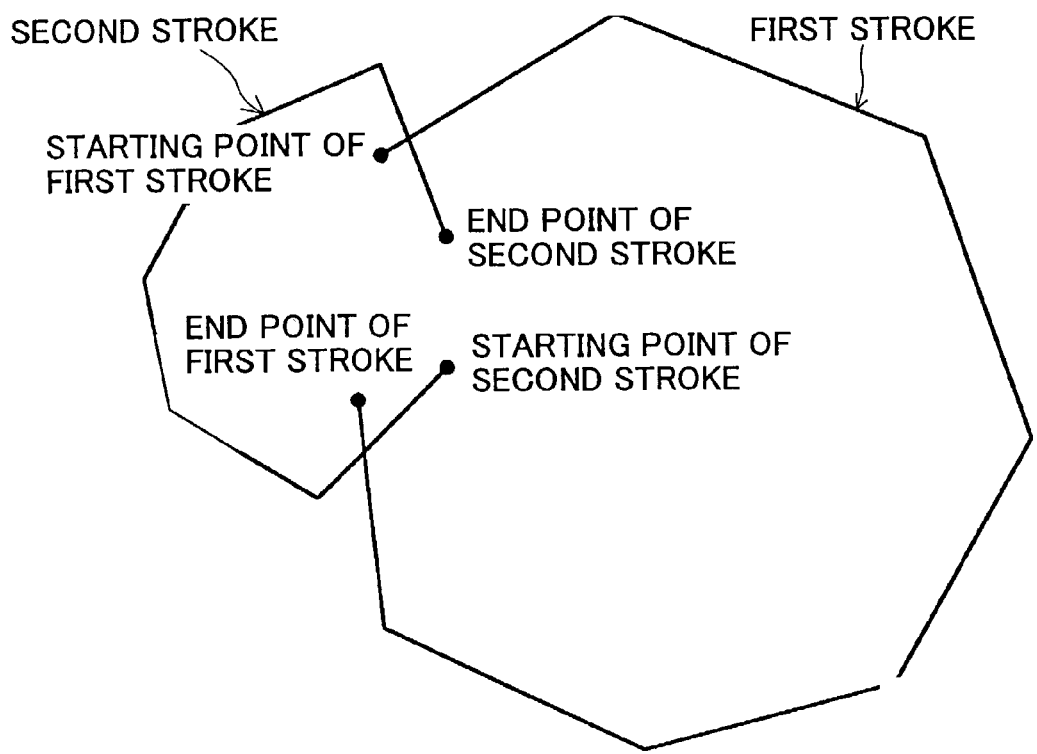
FIG. 4 is a diagram showing example drawings of first and second strokes according to the first embodiment of the present invention.

FIG. 4 is a diagram showing example drawings of the first and second strokes ST[a] and ST[a+1] when steps S002 and S003 are performed.

If it is determined in step S003 that the closed region part of the second stroke ST[a+1] includes the end point (ST[a].X[n], ST[a].Y[n]) of the first stroke ST[a], next, in step S004, the distance between the line segment connecting the starting and end points of the first stroke ST[a] and the starting point (ST[a+1].X[1], ST[a+1].Y[1]) of the second stroke ST[a+1] is calculated. If it is determined as a result of the calculation that the distance is sufficiently small, next, in step S005, the distance between the line segment connecting the starting and end points of the first stroke ST[a] and the end point (ST[a+1].X[n], ST[a+1].Y[n]) of the second stroke ST[a+1] is calculated. If it is determined as a result of the calculation that the distance is sufficiently small, the first stroke ST[a] is determined to be the command region, and the second stroke ST[a+1] is determined to be the tag region for the first stroke ST[a].

In step S006, it is determined whether a stroke is included in the closed region part of the first stroke ST[a]. If it is determined in step S006 that a stroke is included in the closed region part of the first stroke ST[a], in step S007, the first stroke ST[a] is determined to be the command region for stroke transmission, and in step S008, the second region ST[a+1] is determined to be the tag region for the first stroke ST[a]. Then, in step S009, the first and second strokes ST[a] and ST[a+1] are stored in the command region determination part 23. In step S010, the stroke included in the first stroke ST[a] is detected and transmitted to the stroke transmission part 24 as bit map data.

If it is determined in step S006 that no stroke is included in the closed region part of the first stroke ST[a], in step S011, the first stroke ST[a] is determined to be the command region for command transmission, and in step S012, the second stroke ST[a+1] is determined to be the tag region for the first stroke ST[a]. Then, in step S013, the first and second strokes ST[a] and ST[a+1] are stored in the command region storage part 23.

For the above-described operation of steps S002 and S003, a well-known technique such as described in the following Web page is employed, for instance.

http://www5d.biglobe.ne.jp/~tomoya03/shtml/algorithm/Hougan.htm

The outline of the technique shown in the above-described Web page is as follows.

A stroke is composed of several coordinate points, and a locus formed by connecting the coordinate points can be considered as a polygon. The operation of determining whether a point is included in the stroke (hereinafter, this may be referred to as a point inclusion determination operation or process) can be replaced by determining whether a given point is included in the polygon formed by the coordinate points.

Figure 5:
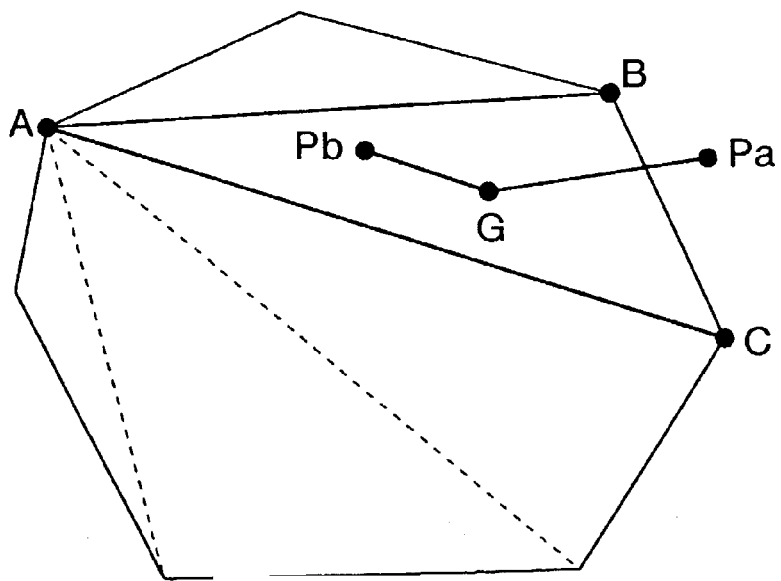
FIG. 5 is a diagram for illustrating an operation of determining whether a point is included in a stroke according to the first embodiment of the present invention.

As shown in FIG. 5, first, the polygon is considered to be a set of triangles, and it is determined whether the given point is included in any of the triangles forming the polygon.

For instance, the vertexes of one of the triangles forming the polygon are defined as A, B, and C, the center of gravity of the triangle ABC is defined as G, and the given point on which determination is made as to whether to be included in the polygon is defined as P. For the purpose of description, the given point P is assumed to have two states Pa and Pb. Here, if the line segment PG crosses any of the line segments AB, BC, and CA, it is determined that the given point P is not included in the triangle ABC.

In the case of FIG. 5, for instance, it is determined that Pa is not included in the triangle ABC since the line segment PaG crosses the line segment BC. On the other hand, it is determined that Pb is included in the triangle ABC since the line segment PbG crosses none of the line segments AB, BC, and CA.

The above-described operation is performed on each of the triangles forming the polygon, and if the given point is included in any of the triangles, it is determined that the given point is included in the polygon. On the other hand, if the given point is included in none of the triangles, it is determined that the given point is not included in the polygon.

Figure 6:
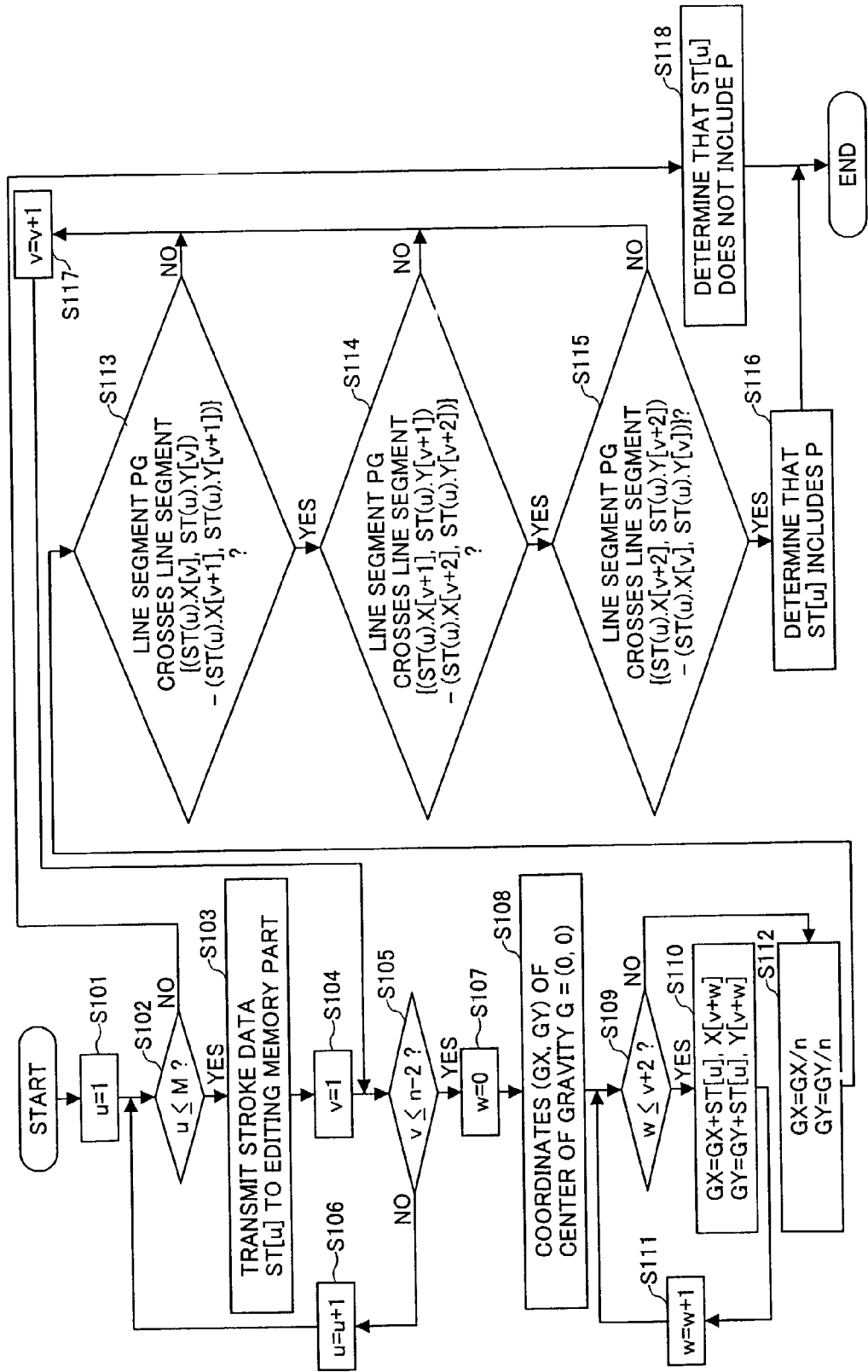
FIG. 6 is a flowchart of the determination operation illustrated in FIG. 5.

FIG. 6 is a flowchart of the above-described determination process as to whether a stroke includes a point, showing the operation of steps S002 and S003 in detail.

In the case of FIG. 6, it is determined whether a coordinate point P (px, py) is included in a stroke ST[u]. First, in steps S101 through S106, the stroke ST[u] is checked with respect to u satisfying $1 \leq u \leq M$. Of the vertexes forming the stroke ST[u], three vertexes (ST[u].X[v], ST[u].Y[v]), (ST[u].X[v+1], ST[u].Y[v+1]), and (ST[u].X[v+2], ST[u].Y[v+2]) forming a triangle are determined so that it is determined whether each triangle of the stroke ST[u] includes the coordinate point P. Specifically, in step S101, "1" is substituted in the temporary variable "u". In step S102, it is determined whether $u \leq M$. If $u \leq M$, in step S103, the stroke data ST[u] is transmitted to the editing memory part 28. Then, in step S104, "1" is substituted in the temporary variable "v". In step S105, it is determined whether $v \leq n-2$. If $v \leq n-2$, step S107 is performed. If $v > n-2$, in step S106, "u" is incremented by "1" and step S102 is performed.

In steps S107 through S112, the coordinates (GX, GY) of the center of gravity G of the triangle are calculated. In step S107, "0" is substituted in a temporary variable "w". In step S108, "0" is substituted in each of GX and GY. In step S109, it is determined whether $w \leq v+2$. If $w \leq v+2$, step S110 is performed. If $w > v+2$, step S112 is performed. In step S110, the horizontal coordinate values of the stroke ST[u] are summed up and the vertical coordinate values of the stroke ST[u] are summed up. In step S111, "w" is incremented by "1" and step S109 is performed. In step S112, the average of the horizontal coordinate values of the stroke ST[u] and the average of the vertical coordinate values of the stroke ST[u] are obtained, that is, the coordinates (GX, GY) of the center of gravity G are calculated.

In steps S113 through S115, it is determined whether the line segment PG crosses any of the line segments of the triangle. Thereby, it is determined whether the coordinate point P (px, py) is included in the triangle formed by the three points (ST[u].X[v], ST[u].Y[v]), (ST[u].X[v+1], ST[u].Y[v+1]), and (ST[u].X[v+2], ST[u].Y[v+2]) of the coordinate points forming the stroke ST[u]. Specifically, in step S113, it is determined whether the line segment PG crosses the line segment {(ST[u].X[v], ST[u].Y[v])–(ST[u].X[v+1], ST[u].Y[v+1])}, in step S114, it is determined whether the line segment PG crosses the line segment {(ST[u].X[v+1], ST[u].Y[v+1])–(ST[u].X[v+2], ST[u].Y[v+2])}, and in step S115, it is determined whether the line segment PG crosses the line segment {(ST[u].X[v+2], ST[u].Y[v+2])–(ST[u].X[v], ST[u].Y[v])}. If the line segment PG crosses any of the line segments of the triangle in steps S113 through S115, it is determined that the coordinate point P is not included in the triangle, and v is incremented in step S117 so that the next triangle is determined. If the line segment PG crosses none of the line segments of the triangle in steps S113 through S115, it is determined that the coordinate point P is included in the triangle. That is, in step S116, it is determined that the coordinate point P is included in the stroke ST[u] and the operation ends. If it is determined in step S105 that v is larger than n–2, in step S106, u is incremented. If it is determined in step S102 that u is larger than M, it is determined in step S118 that the coordinate point P is not included in any of the strokes ST[1] through ST[M], and the operation ends.

In steps S002 and S003, the above-described determination process is performed on the second stroke ST[a+1] and the starting point (ST[a].X[1], ST[a].Y[1]) and the end point (ST[a].X[n], ST[a].Y[n]) of the first stroke ST[a].

Figure 7:
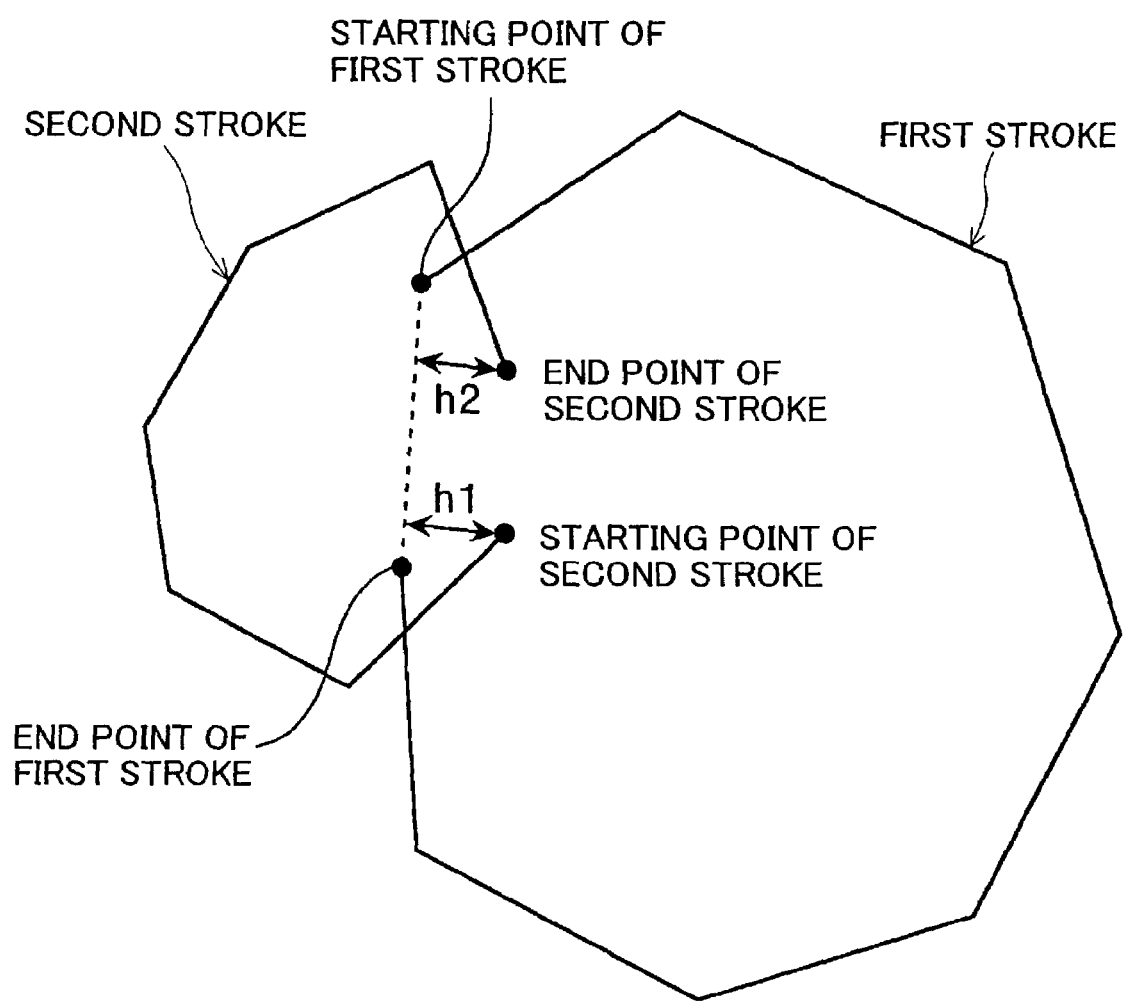
FIG. 7 is a diagram for illustrating the operation of steps S004 and S005 of FIG. 3.

FIG. 7 is a diagram for illustrating the operation of steps S004 and S005. As previously described, in steps S004 and S005, it is determined whether the calculated distances between the points and the line segment satisfy the conditions for determining the command and tag regions.

The distance between each point and the line segment is calculated by using a well-known technology. For instance, a distance h between a line segment AB consisting of two coordinate values A(x0, y0) and B(x1, y1) and a coordinate point P(x2, y2) can be measured as the length of a perpendicular drawn from the coordinate point P to the line segment AB.

By the above-described measurement operation, a distance h1 between the line segment connecting the starting and end points of the first stroke ST[a] and the starting point of the second stroke ST[a+1] and a distance h2 between the line segment connecting the starting and end points of the first stroke ST[a] and the end point of the second stroke ST[a+1] are calculated. As a result, if it is determined in step S004 that the distance h1 is sufficiently small and it is determined in step S005 that the distance h2 is sufficiently small, that is, if both distances h1 and h2 satisfy the condition h1, h2≦40 pixels, for instance, the closed region part of the first stroke ST[a], that is, the inside of the polygon formed by the coordinate points of the first stroke ST[a], is determined to be the command region, and the closed region part of the second stroke ST[a+1], that is, the inside of the polygon formed by the coordinate points of the second stroke ST[a+1], is determined to be the tag region.

By the operation of determining the command region using two successive strokes, ordinary strokes for drawing and strokes for the command and tag regions input by the user can be differentiated from each other.

That is, it can be determined distinctively whether the user wishes to make only a drawing or to create the command region by providing geometric restrictive conditions between two strokes in order to determine the command and tag regions proposed in the present invention.

Figure 8B:
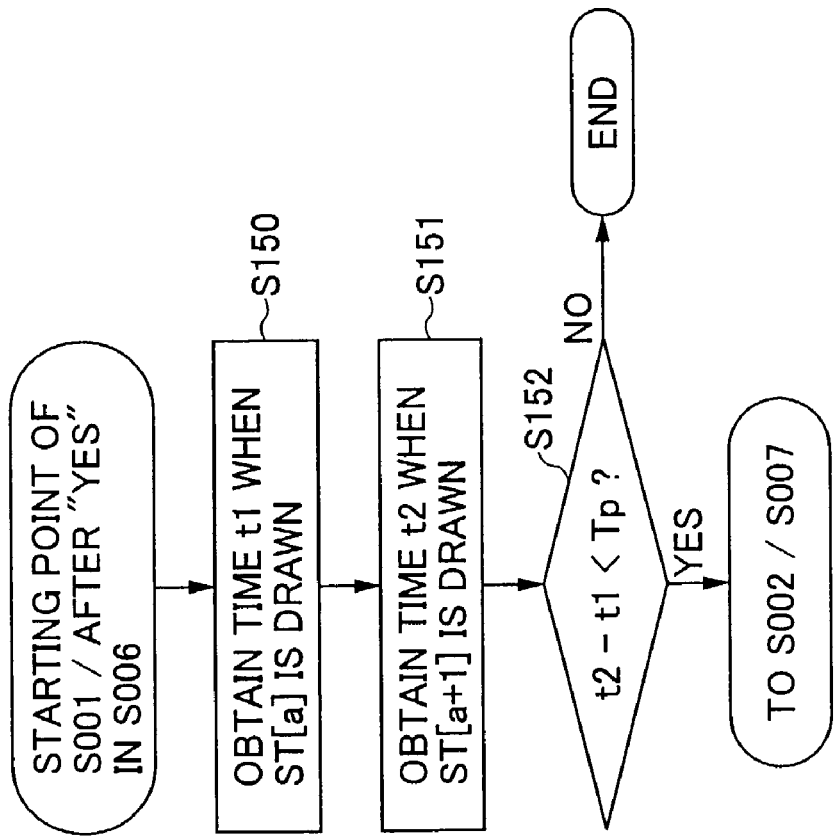
FIGS. 8A and 8B are diagrams for illustrating an operation in the case of considering time as a restrictive condition in determining the command region and the tag region according to the first embodiment of the present invention.
Figure 8A:
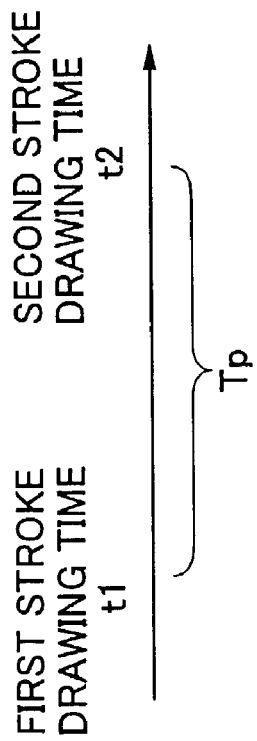

Further, according to the present invention, the passage of time may be considered as a restrictive condition in determining the command and tag regions as shown in FIGS. 8A and 8B. This operation may be incorporated into the operation of step S001 or S006 of FIG. 3.

As shown in FIG. 8A, letting a time when the first stroke ST[a] is drawn and a time when the second stroke ST[a+1] is drawn be t1 and t2, respectively, the above-described operation of determining the command region as shown in FIGS. 2 through 7 is performed when a time difference t2−t1 satisfies a predetermined condition in comparison with a predetermined period Tp. If the time difference t2−t1 does not satisfy the predetermined conditions with respect to the predetermined period Tp, the above-described operation of determining the command region is not performed, that is, the first and second strokes ST[a] and ST[a+1] are stored as ordinary strokes.

FIG. 8B shows the flow of the above-described operation of considering the passage of time more specifically. In the case of considering the passage of time, the stroke storage part 21 stores time information on drawn strokes.

First, in step S150 of FIG. 8B, the time t1 when the first stroke ST[a] is drawn is obtained. Next, in step S151, the time t2 when the second stroke ST[a+1] is drawn is obtained. The stroke storage part 21 may obtain the times t1 and t2 as present time information, or measure the elapsed time from the activation of the information processing apparatus 1 for each of the times t1 and t2. Next, in step S152, the time difference t2−t1 is calculated to be compared with the predetermined threshold Tp. If t2−t1<Tp, the operation proceeds to step S002 in the case of incorporating the operation in step S001 of FIG. 3, and to step S007 in the case of performing the operation after "YES" in step S006. If t2−t1≧Tp, the operation ends.

Thus, by considering the passage of time as a restrictive condition for determining the command region, it can be determined whether the user wishes to make only a drawing or to create the command region, though the command and tag regions can be determined only from stroke information without considering the passage of time.

Figure 9:
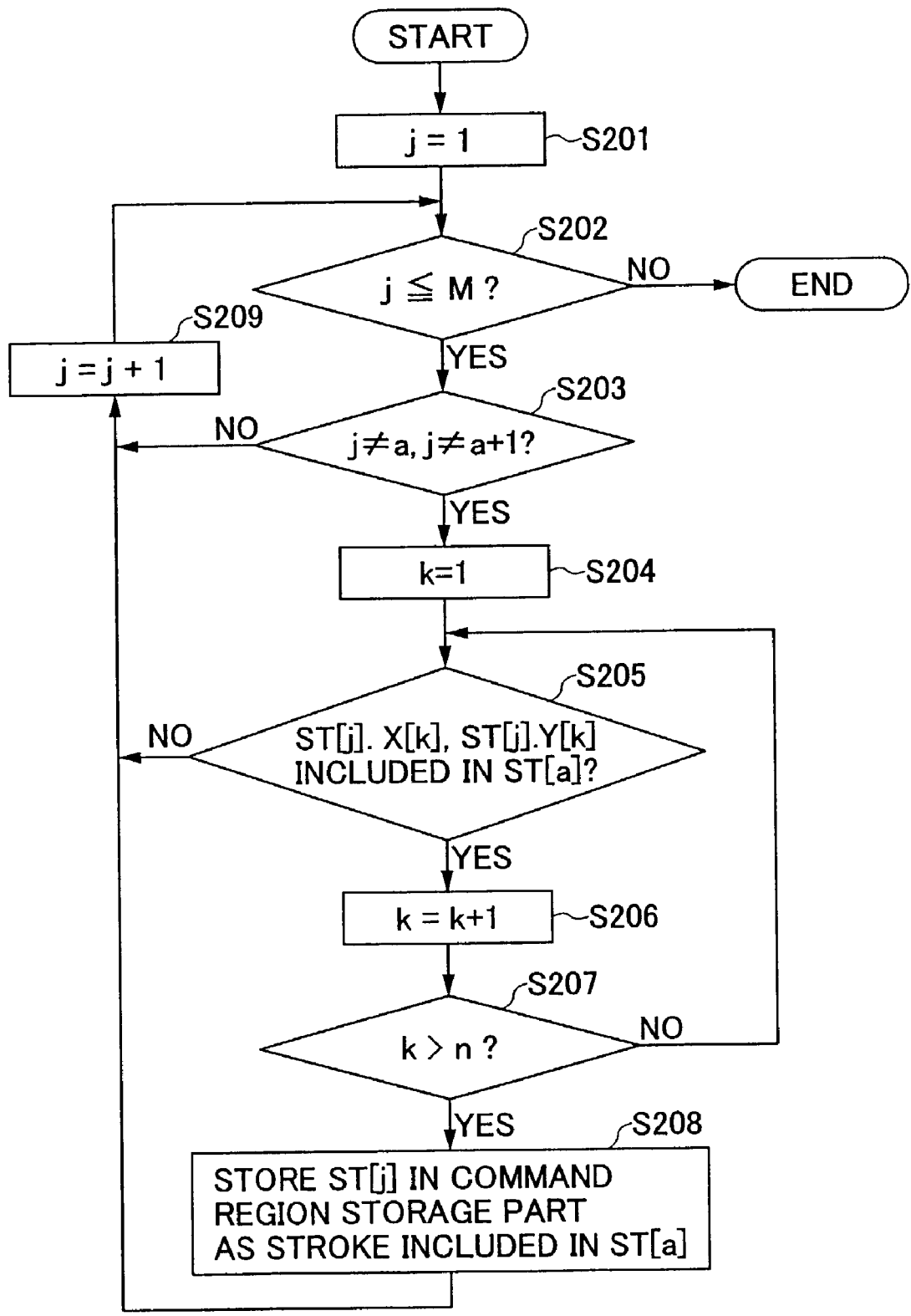
FIG. 9 is a detailed flowchart of the operation of steps S006 through S009 of FIG. 3.

FIG. 9 is a detailed flowchart of the operation of steps S006 through S009 of FIG. 3. The command region has the function of transmitting stroke information to the terminal of a participant as a drawing and the function of transmitting a command for controlling the terminal of the participant. Therefore, it is determined whether the created command region is for drawing (stroke) transmission or command transmission.

First, a description will be given of the operation of determining whether the command region is for drawing transmission. It is determined whether the command region includes a stroke that is already drawn. If the command region includes a stroke, the command region is determined to be for drawing transmission.

The algorithm of the above-described point inclusion determination process is applied to coordinate information forming each stroke in order to determine whether a given stroke includes a point. That is, with respect to a stroke ST[j] (1≦j≦M) that is not recorded as a command region among the strokes ST[1] through ST[M], the above-described point inclusion determination process is applied to each of the coordinate points (ST[j].X[k], ST[j].Y[k]) (1≦k≦n) forming the stroke ST[j] so as to determine whether the coordinate points are included in the command region ST[a]. As a result, if all of the coordinate points are included in the command region ST[a], it is determined that the stroke ST[j] is included in the command region ST[a], and the ST[j] is stored in the command region storage part 23 as a stroke included in the stroke or command region ST[a].

The strokes determined to be included in the command region ST[a] and retained in the command region storage part 23 as a result of the above-described operation are transmitted as a group to the terminal of the user as drawing information.

More specifically, in step S201, "1" is substituted in the temporary variable "j". In step S202, it is determined whether j≦M. If j≦M, step S203 is performed. If j>M, the operation ends. In step S203, it is determined whether j≠a and j≠a+1. If j≠a and j≠a+1, step S204 is performed. If j=a or a+1, in step S209, "j" is incremented by "1". In step S204, "1" is substituted in the temporary variable "k". In step S205, it is determined whether (ST[j].X[k], ST[j].Y[k]) is included in ST[a]. Here, the same method as described above with reference to FIG. 6 can be used for this determination, which will be more apparent if (ST[j].X[k], ST[j].Y[k]) and ST[a] are replaced with the coordinate point P and ST[u] of FIG. 6, respectively. Then, in step S206, "k" is incremented by "1". In step S207, it is determined whether k>n. If k>n, step S208 is performed. If k≦n, step S205 is repeated. In step S208, the stroke ST[j] is stored in the command region storage part 23 as a stroke included in the stroke ST[a]. Then, in step S209, "j" is incremented by "1" and step S202 is repeated.

Figure 10:
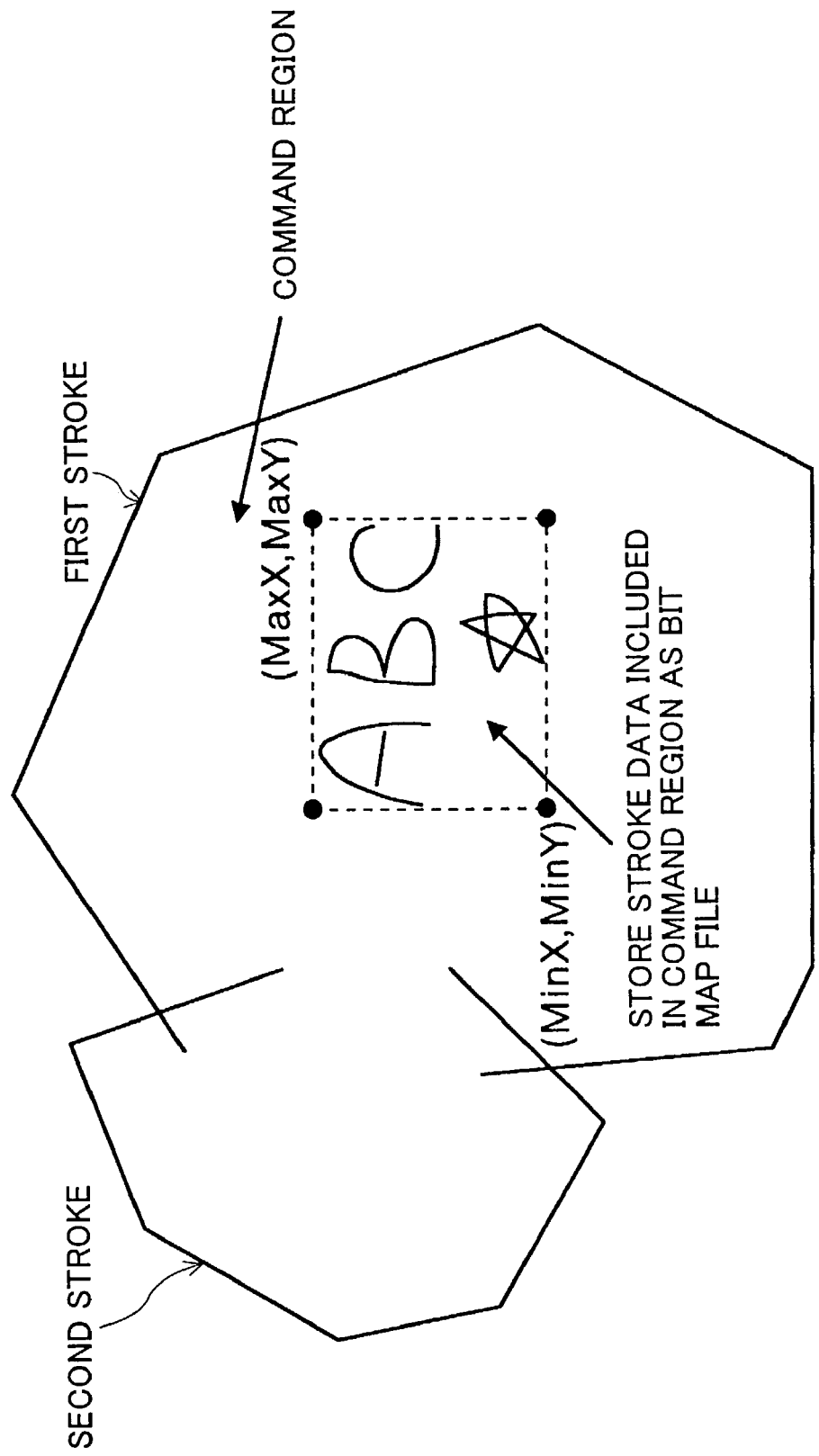
FIG. 10 is a diagram for illustrating an operation of transmitting stroke data as drawing information according to the first embodiment of the present invention.

Next, a description will be given, with reference to FIG. 10, of the operation of transmitting stroke data as drawing information in step S010 of FIG. 3.

First, in the case of storing the strokes included in the command region ST[a] successively in a file as bit map data, the maximum and minimum values of the X coordinates of the included strokes and the maximum and minimum values of the Y coordinates of the included strokes are obtained as indicated by the following expressions:

MaxX=Max (X coordinate values of the included strokes)

MaxY=Max (Y coordinate values of the included strokes)

MinX=Min (X coordinate values of the included strokes)

MinY=Min (Y coordinate values of the included strokes), where Max is a function that returns the maximum of values, and Min is a function that returns the minimum of values.

The included stroke data is drawn in a rectangle defined by the coordinate points (MinX, MinY) and (MaxX, MaxY), and cut off to be stored as a bit map. Here, part of the command region storage part 23 is employed as a bit map file.

A well-known technique can be used to share the file. The drawing information can be shared among a plurality of terminals by storing the bit map file in, for instance, a file system that can be shared on a network. The bit map file is shared by accessing a storage device having the shared folder from the terminals connected to the network.

In step S006 of FIG. 3, if a stroke is not included in the command region ST[a], the command region ST[a] is stored in the command region storage part 23 as a command region for command transmission, and put in a wait state for a stroke input as a gesture.

Figure 11:
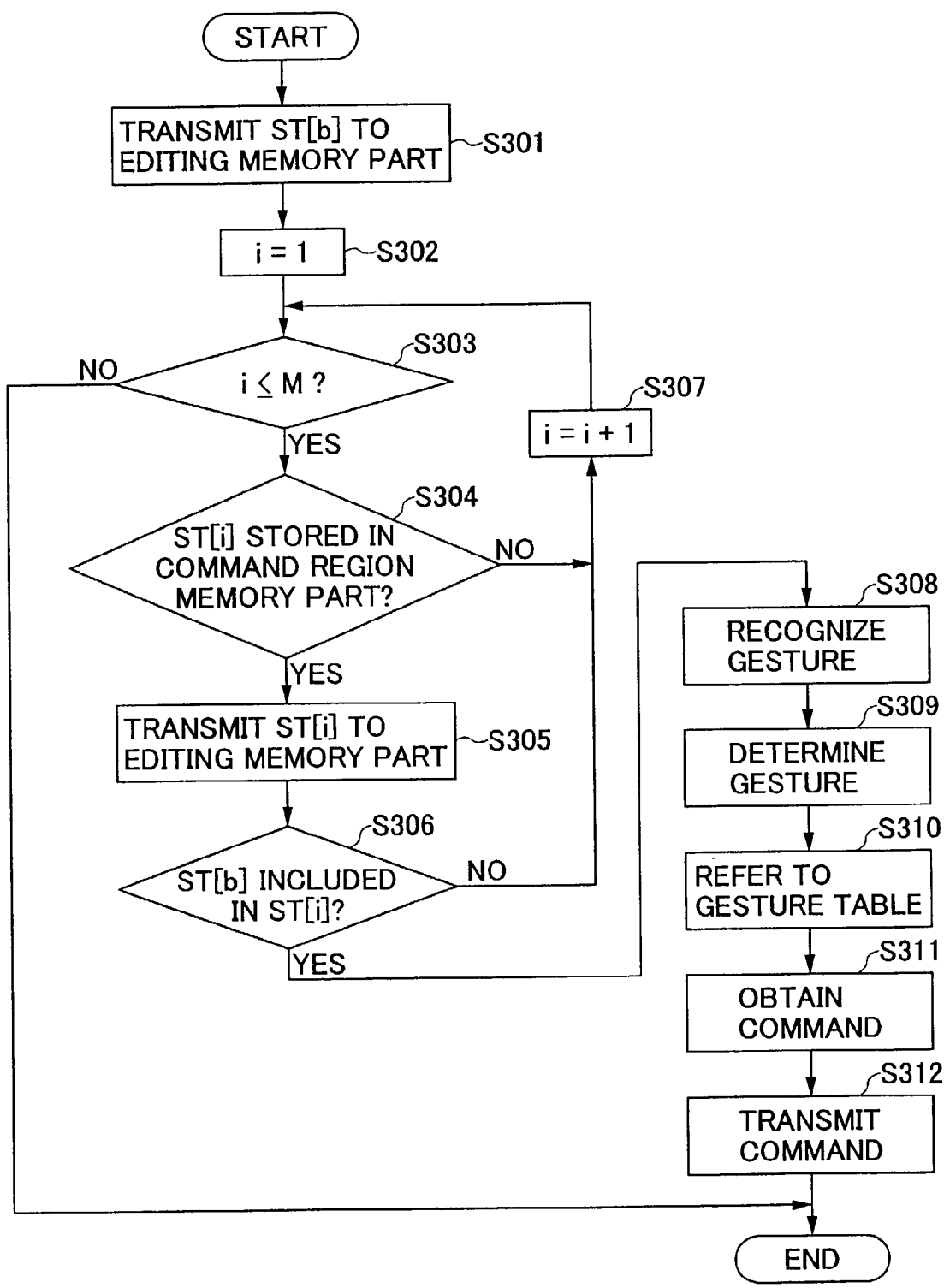
FIG. 11 is a flowchart of an operation of processing a gesture stroke according to the first embodiment of the present invention.

FIG. 11 is a flowchart of the operation of processing a gesture stroke in the command region for command transmission. This operation is performed by the command region determination part 22, the gesture recognition part 25, the gesture reference table 26, and the command transmission part 27.

Here, the command region and the tag region are formed by the two successive first and second strokes ST[a] and ST[a+1], respectively, and the command region ST[a] is for command transmission. A stroke ST[b] is newly input.

When the stroke ST[b] is input, in step S301 of FIG. 11, data on the stroke ST[b] (stroke data ST[b]) is transmitted to the editing memory part 28. Next, in steps S302 through S306, the command region determination part 22 performs the above-described point inclusion determination operation to determine whether the stroke ST[b] is included in the command region ST[a]. The above-described algorithm is applicable to the calculation method of the point inclusion determination operation. Therefore, a description of the calculation method will be omitted.

In step S302, i is set to 1 (i=1), and in step S303, it is determined whether i≦M (M is the maximum stroke number or the number of strokes stored). If it is determined in step S303 that i≦M, in step S304, it is determined whether a stroke ST[i] is stored in the command region storage part 23 as a command region. If it is determined in step S304 that the stroke ST[i] is stored in the command region storage part 23, in step S305, the stroke ST[i] is transmitted to the editing memory part 28. If it is determined in step S304 that the stroke ST[i] is not stored in the command region storage part 23, in step S307, i is incremented by one (i=i+1) so that the next stroke is checked. In step S306, it is determined whether the stroke ST[b] is included in the stroke ST[i]. If it is determined in step S306 that the stroke ST[b] is included in the stroke ST[i], the stroke ST[b] is determined to be a gesture stroke with respect to the stroke ST[i]. If it is determined in step S306 that the stroke ST[b] is not included in the stroke ST[i], step S307 is performed so that the next stroke is checked.

If it is determined that the newly input stroke ST[b] is drawn inside the command region for command transmission, the stroke ST[b] is defined as a command stroke, and the gesture recognition part 25 performs a gesture recognition operation (step S308) on the command stroke ST[b].

The gesture recognition part 25 calculates the shape of the stroke ST[b]. The gesture table reference part 26 refers to the gesture table storage part 29 based on the shape of the stroke ST[b], and a command corresponding to the shape in the gesture table is transmitted from the command transmission part 27.

The gesture recognition operation is performed by calculating a variety of features representing the stroke shape as described below.

A well-known technique such as described in "Pattern Recognition," Kenichi Mori et al., The Institute of Electronics, Information and Communication Engineers (IEICE) (1993) is employed for calculating a geometric feature.

First, the following elements are calculated:

Number of coordinate points (point)=the total number of coordinate points constituting ST[b]

Length (length)=the sum of lengths between the coordinate points constituting ST[b]

Area (area)=the area of the polygon forming ST[b]

Rectangular area (rec_area)=the area of the rectangle in which ST[b] is processed with the coordinate points (MinX, MinY) and (MaxX, MaxY)

Variance of coordinate values in the horizontal direction (stdx)=the variance of ST[b].X[1] through ST[b].X[n]

Variance of coordinate values in the vertical direction (stdy)=the variance of ST[b].Y[1] through ST[b].Y[n]

Possession (pos)=area/rec_area

Circularity (circ)=4*π*area/(length*length)

Complexity (comp)=length*length/area

Number of self-crossings (sc)=the sum of the numbers of self-crossings of the respective line segments constituting ST[b].

Here, the self-crossing refers to crossing of the line segments formed by successively connecting the coordinate points constituting the stroke ST[b].

For determining crossing of the line segments, a well-known technique such as described in the following Web page is employed, for instance.

http://www5d.biglobe.ne.jp/~tomoya03/shtml/algorithm/Hougan.htm

The outline of the technique shown in the above-described Web page is as follows.

Figure 12:
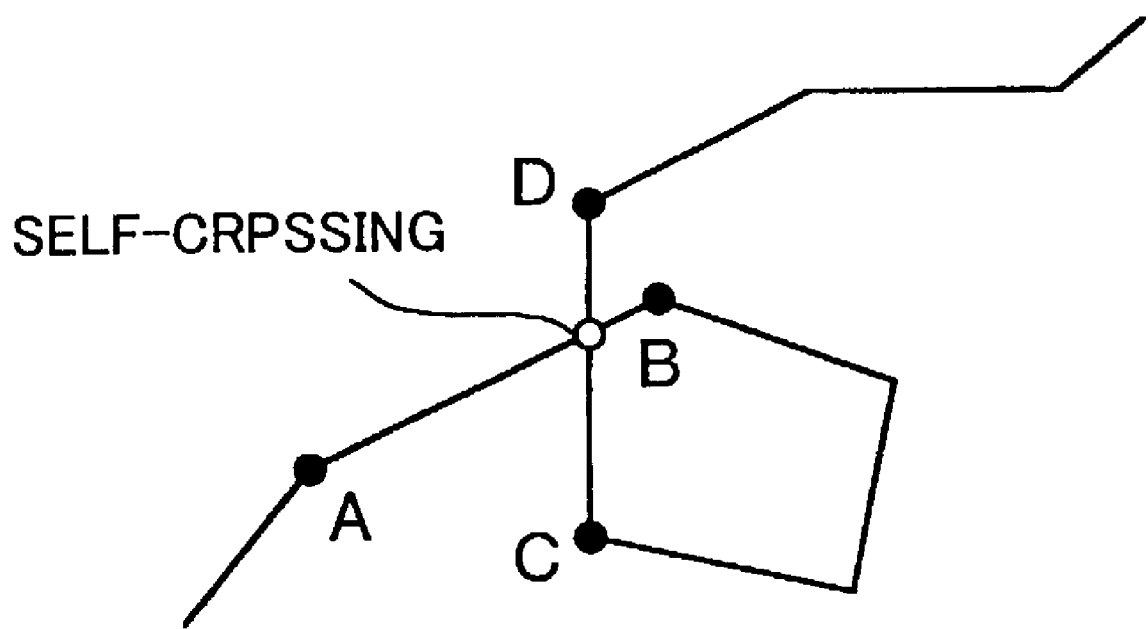
FIG. 12 is a diagram showing a self-crossing according to the first embodiment of the present invention.

FIG. 12 is a diagram showing a self-crossing. When there are coordinate points A, B, C, and D, that the line segments AB and CD cross each other means that the straight line passing the coordinate points A and B crosses the line segment CD and the straight line passing the coordinate points C and D crosses the line segment AB. Therefore, when the two coordinate points constituting the line segment are on the opposite sides of the straight line serving as a boundary, that is, when the straight line is given by "y=dx+ e" and the values obtained as a result of substitution of the two coordinate points into "y−dx−e" have different signs, it is considered that the straight line and the line segment cross each other. As a result of performing this calculation operation on the combination of the straight line AB and the coordinate points C and D and on the combination of the straight line CD and the coordinate points A and B, if it is determined in each combination that the straight line crosses the line segment, it is determined that the line segments AB and CD cross each other.

By performing the above-described segment crossing determination operation on the line segments formed by successively connecting the coordinate points forming the stroke ST[b], the number of self-crossings can be calculated.

Here, for instance, i and j are variables each independently taking values ranging from 1 to n (the number of vertexes of a target stroke). Then, with respect to the line segments AB and CD formed by the coordinate points A (ST[b].X[i], ST[b].Y[i]), B (ST[b].X[i+1], ST[b].Y[i+1]), C (ST[b].X[j], ST[b].Y[j]), and D (ST[b].X[j+1], ST[b].Y[j+1]), a crossing of line segments is detected in every case except for those of conditions i=j, i=j+1, and j i+1. The sum of the crossings detected at this point is determined to be the number of self-crossings of the stroke ST[b].

In step S309, the gesture recognition part 25 determines the stroke ST[b] to be a gesture based on a variety of combinations of the features representing the shape of the stroke ST[b], such as "the length is sufficiently small," "the circularity is high and the possession is low," "the circularity is low and the possession is high," and "the number of self-crossings is one and the variance in the horizontal direction is larger than that in the vertical direction." When the gesture recognition part 25 recognizes the stroke ST[b] as a gesture, the gesture recognition part 25 assigns an ID number to the stroke ST[b] based on its shape. If the gesture recognition part 25 does not recognize the stroke ST[b] as a gesture in step S309, the stroke ST[b] is stored in the stroke storage part 21 as an ordinary stroke.

The stroke ST[b] is recognized as a gesture based on the following combinations of the features of its shape, for instance. Here, a description will be given, in the form of program codes, of a method of recognizing seven commands of "mouse click", "mouse down", "mouse up", "arrow key up", "arrow key down", "arrow key right", and "arrow key left." In the following description, numeric parameters are based on empirical values for the purpose of description.

In the case of "mouse click," for instance, a stroke is recognized as "mouse click" when the stroke has a length smaller than nine and the number of vertexes smaller than five. The other commands are recognized based on the combinations of a variety of features. Not only the number of gestures but also the number of commands can be increased by combining the features of the shape of the stroke in other ways than described herein.

```
// Recognition of "mouse click"
    if length < 9 and point < 5 then MOUSE_CLICK
// Recognition of "mouse down" and "mouse up"
    if stdx > 5 and stdy < 5 and pos < 0.84 and
```

-continued

```
    circ > 0.86 and comp < 16 then
        if ST[b].X[0]>ST[b].X[ST[b].n]then
            if stdx > 5 and stdy > 5 and circ > 0.86
    and comp < 16 then
            if ST[b].X[0]>ST[b].X[ST[b].n]then
                MOUSE_DOWN;
            else
                MOUSE_UP;
            endif
        endif
// Recognition of arrow keys
    if sc = 1 then
            if stdx > stdy then
                if ST[b].X[0]>ST[b].X[ST[b].n]then
                    KEY_ARROW_RIGHT;
            else
                    KEY_ARROW_LEFT;
            endif
    else
            if ST[b].Y[0]>ST[b].Y[ST[b].n]then
                KEY_ARROW_UP;
            else
                    KEY_ARROW_DOWN;
            endif
    endif
....
```

When a gesture is specified from the shape of the stroke ST[b] and its gesture ID is determined, in step S310, the gesture table reference part 26 refers to the gesture table storage part 29 for a command corresponding to the gesture ID The gesture table storage part 29, which is provided in the central control unit 20, is a memory table recording the relationship between the gesture IDs and their corresponding commands. As a result of referring to the command from the gesture in step S310, in step S311, the command is obtained, and in step S312, the command transmission part 27 transmits the command to the terminal of the user.

In the terminal of the user, a later-described mouse and keyboard event occurrence server is activated so as to obtain and analyze the transmitted command. Thereby, the command can be fed back to the user as an actual action.

FIG. 13 is a table that is an embodiment of the gesture table storage part 29. Strokes recognized as gesture strokes, ID values corresponding to the gesture strokes, and commands corresponding to the gesture strokes are provided in the left, center, and right columns, respectively, of the table. A command to emulate an event of the mouse or keyboard of the user terminal, for instance, can be written. The command can be written not only as a single mouse or keyboard event but also as a combination of a plurality of events.

Figure 14:
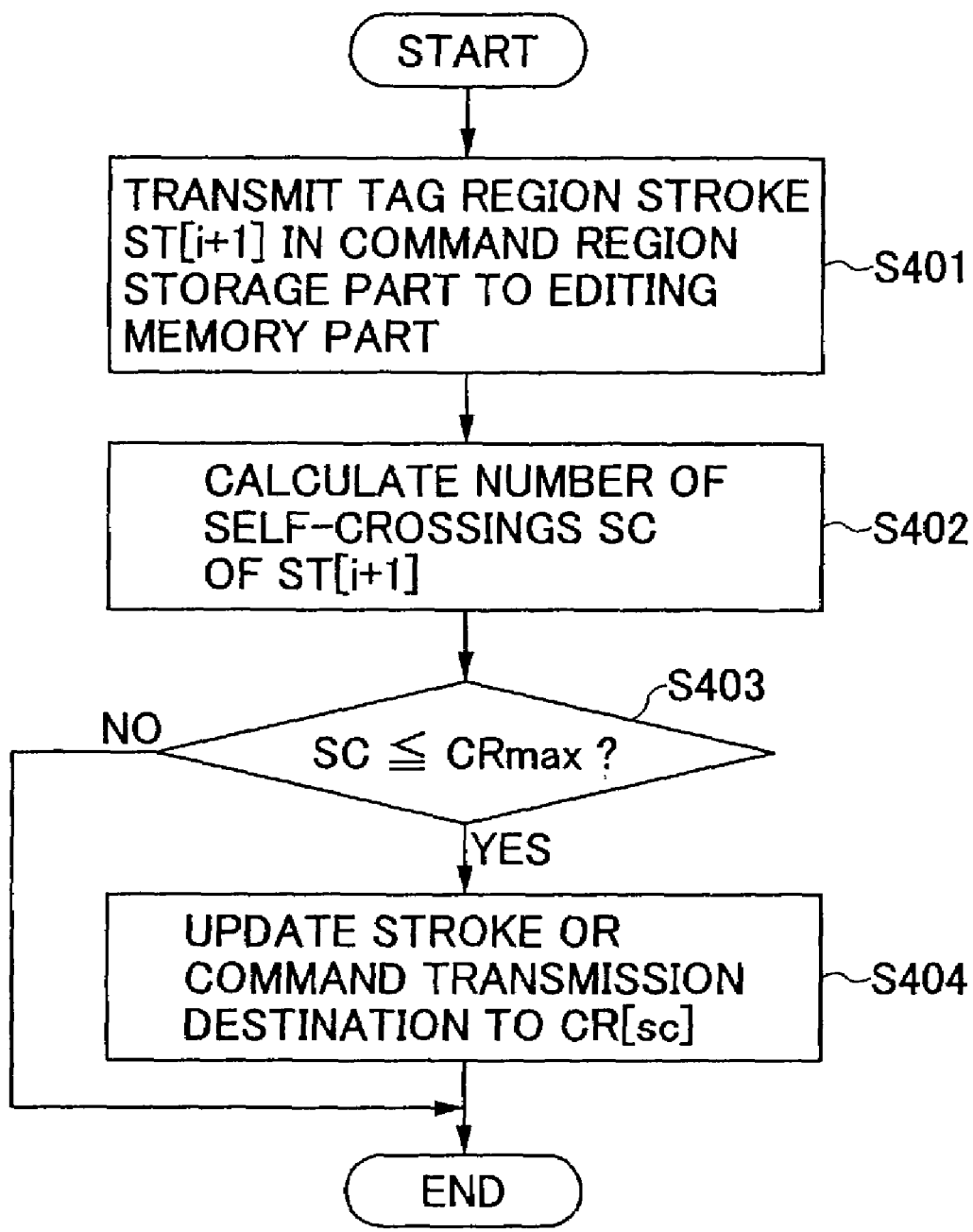
FIG. 14 is a detailed flowchart of the operation of step S009 or S013 of FIG. 3.

FIG. 14 is a detailed flowchart of the operation of step S009 or S013 performed in the command region storage part 23.

According to the present invention, the number of self-crossing points (self-crossings) of the second stroke ST[a+1] forming the tag region is calculated so that the destination of stroke or command transmission of the command region can be switched from one to another based on the calculated number of self-crossings.

The format of storing the command region in the command region storage part 23 is expressed in the C language structure as follows:

```
struct command_region {
    int type;
    int stroke_id;
    string hostname;
    string ip_address;
    int ser_port;
    int cli_port;
    string login_name;
    string passwd;
    ...
}CR[CRmax];
```

CR is the structure data of the command region. CRmax indicates the maximum element number or the number of elements of CR. Further, type is a variable storing a constant indicating whether the command region is for stroke transmission or for command transmission. Stroke_id is the number of the stroke detected as the command region (the index number of the stroke array ST). In addition, attribute information on the destination of transmission, such as host name (hostname), IP address (ip_address), connecting ports (ser_port and cli_port), login user name (login_name), and password (passwd), is stored. String expresses the data type of a character string.

When a stroke ST[i] is stored as the command region in step S009 or S013 of FIG. 3, in step S401 of FIG. 14, a tag region ST[a+1] for the stroke ST[i] is transmitted to the editing memory part 28.

Next, in step S402, the number of self-crossings of the stroke ST[i+1] is calculated. The above-described algorithm is applicable as a method of calculating the number of self-crossings, and therefore, a description of the calculation method will be omitted.

Next, in step S403, it is determined whether the calculated value sc exceeds the maximum value CRmax of CR. If it is determined in step S403 that sc exceeds CRmax, the operation ends. If it is determined in step S403 that sc is smaller than or equal to CRmax, in step S404, CR[sc] is referred to and the attribute information of CR[sc] is read out so that the destination of transmission is updated to the attribute information.

Figure 15:
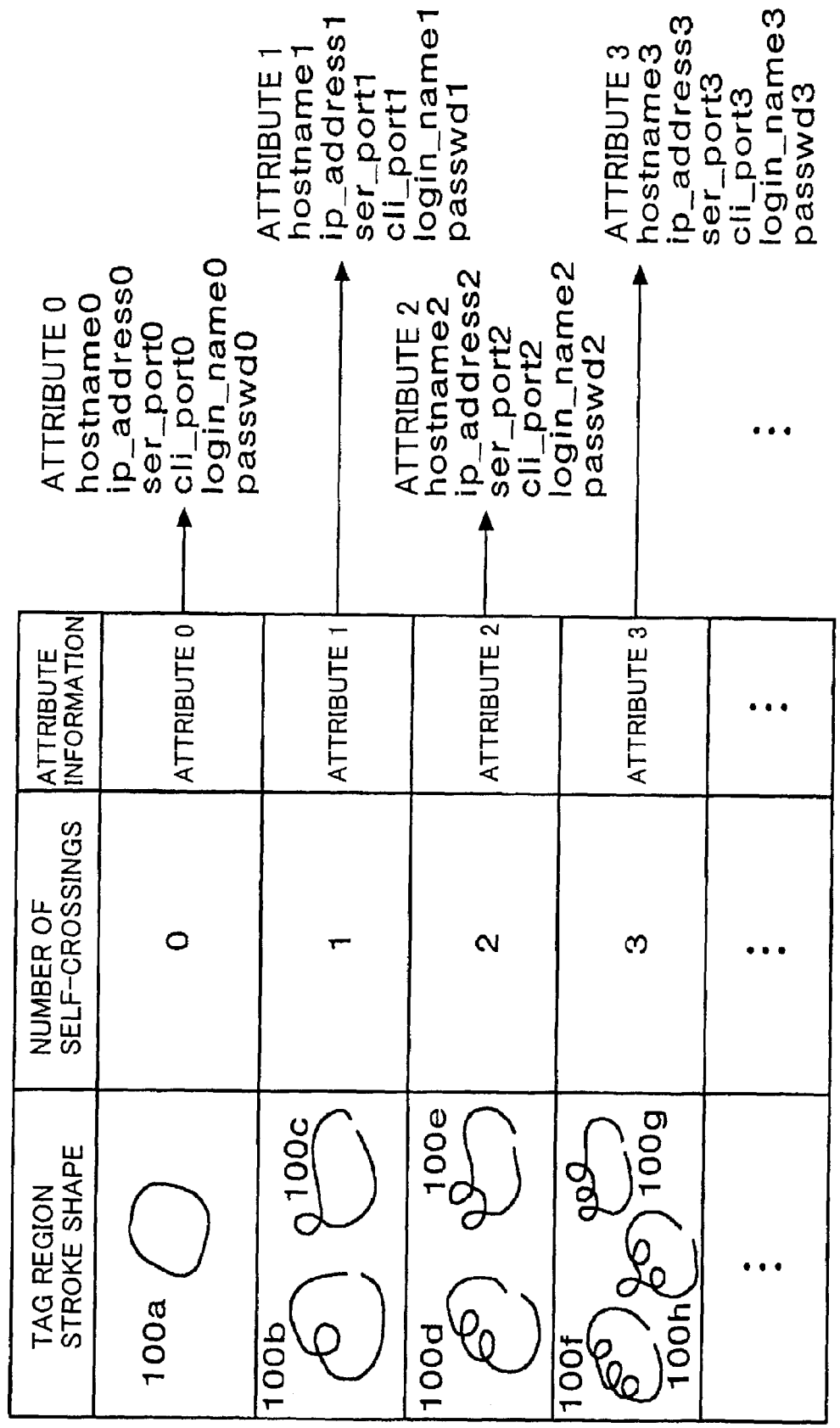
FIG. 15 is a conceptual diagram showing a relationship among the shape of a stroke determined to be the tag region, the number of self-crossings (sc), and attribute information according to the first embodiment of the present invention.

FIG. 15 is a conceptual diagram showing the relationship among the shape of a stroke determined to be the tag region (a tag region stroke), the number of self-crossings sc, and attribute information. The attribute information refers to the members (variables) of the CR[sc] structure, that is, host name, IP address, connecting ports, login user name, and password in the above-described format of storing the command region. The number of self-crossings of the tag (region) stroke is calculated, so that the attribute information is updated based on the calculated number as described above. That is, letting the calculated number be sc, CR[sc] is referred to so that the destination of transmission is changed to a new destination based on the "hostname" and "ip_address" information, the numbers of ports to be connected are changed based on the "ser_port" and "cli_port" information, and the new destination is accessed based on the "login_name" and "passwd" information.

The specific data of the attribute information, such as host name, IP address, connecting ports, login user name, and password, may be prestored in the editing memory part 28, or recorded on a file and read out from the file into the editing memory part 28 as required. These values are changed or edited as required.

In the case of "host name", for instance, known host name data can be substituted beforehand in the corresponding variables of the structures as CR[1].hostname="hostpc1," CR[1].hostname="hostpc2," . . . .

In the case of prestoring the data in a file and reading out the data from the file as required, the data of "host name, IP address, self-port number, destination port number, login name, and password" of each structure may be stored in a line, being segmented by commas, as follows:

```
hostpc1,169.254.255.0,1000,1001,john,john's password
hostpc2,169.254.255.0,1000,1001,mike,mike's password
hostpc3,169.254.255.0,1000,1001,mary,mary's password
```

At this point, in the case of sc=0, for instance, the above-described data are read out from the file, so that the data can be read out successively in accordance with the number of self-crossings as CR[0].hostname="hostpc1",CR[0].ip_address="169.254.25 5.0",CR[0].ser_port=1000,CR[0].cli_port=1001,CR[0].login_name="john",CR[0].passwd="john'spassword."

The tag region stroke may take any shape as far as a self-crossing part can be detected therein. For instance, the tag region stroke may be self-crossed to have a self-crossing part formed outside the tag region stroke as in shapes 100c, 100e, and 100g of FIG. 15. Alternatively, the tag region stroke may be self-crossed to have a self-crossing part formed inside the closed region part of the tag region stroke as in shapes 100b, 100d, and 100f of FIG. 15. Further, the tag region stroke may also be self-crossed to have self-crossing parts formed both inside and outside the tag region stroke as in a shape 100h of FIG. 15.

The destination of stroke transmission and the destination of command transmission can thus be specified and changed according to the number of self-crossings sc of the tag region stroke. Therefore, stroke information or a command controlling an individual terminal can be transmitted to a specified one selected from a plurality of terminals.

Figure 16:
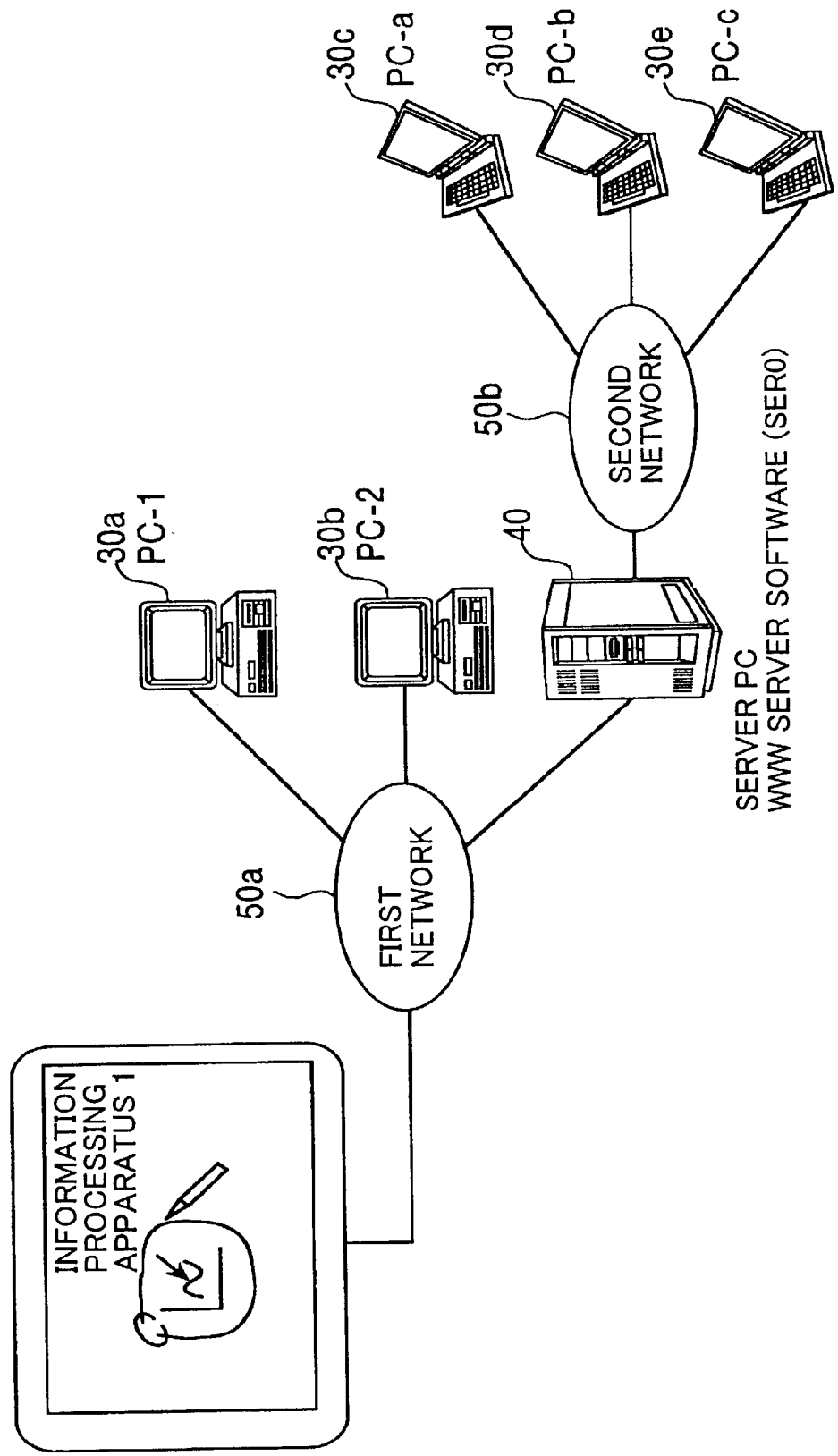
FIG. 16 is a diagram showing a system configuration in the case of performing a stroke transmission function of the command region according to the first embodiment of the present invention.

FIG. 16 is a diagram showing a system configuration in the case of performing the stroke transmission function of the command region. As previously described, a given stroke can be transmitted to a plurality of terminals through steps S006 through S010.

For instance, the information processing apparatus 1 of this embodiment is connected to a plurality of terminals on networks as shown in FIG. 16. That is, in the case of FIG. 16, the information processing apparatus 1 and three terminals of a PC-1 30a, a PC-2 30b, and a server PC 40 are connected to a first network 50a. The server PC 40 is further connected to a second network 50b, which is connected to three terminals of a PC-a 30c, a PC-b 30d, and a PC-c 30e. The number of PCs is not limited to that of FIG. 16. The first and second networks 50a and 50b are provided separately for convenience of description in FIG. 16, but may be configured as one network. A well-known technology such as Ethernet® is employed herein as a network technology, and therefore, a description thereof will be omitted.

As previously described, by using the stroke transmission function of the command region of the present invention, the bit map file of a given stroke, for instance, can be transmitted from the information processing apparatus 1 to the PC-1 30a, the PC-2 30b, and the server PC 40. As a transmission method, a well-known technology such as the shared folder of Microsoft Windows®, FTP (File Transfer Protocol), HTTP (Hyper Text Transfer Protocol), or SMTP (Simple Mail Transfer Protocol) may be employed, and therefore, a description thereof will be omitted.

The bit map file information of the stroke can be further shared among the PC-a 30c, the PC-b 30d, and the PC-c 30e by activating WWW (World Wide Web) server software SER0 on the server PC 40. A well-known technology can be used for the WWW server software.

The destination of transmission can be selectively specified and changed by the destination switching function described with reference to FIGS. 14 and 15. By writing, for instance, that a stroke in the command region is transmitted to the PC-1 30a when the number of self-crossings of the tag region is one, the destination of stroke transmission can be limited to the PC-1 30a when the command region is drawn with the tag region having one self-crossing. Since the destination of transmission can be thus changed, specified users can share information or a user can share a situation with a large number of users. Therefore, a variety of information sharing methods can be realized.

Figure 17:
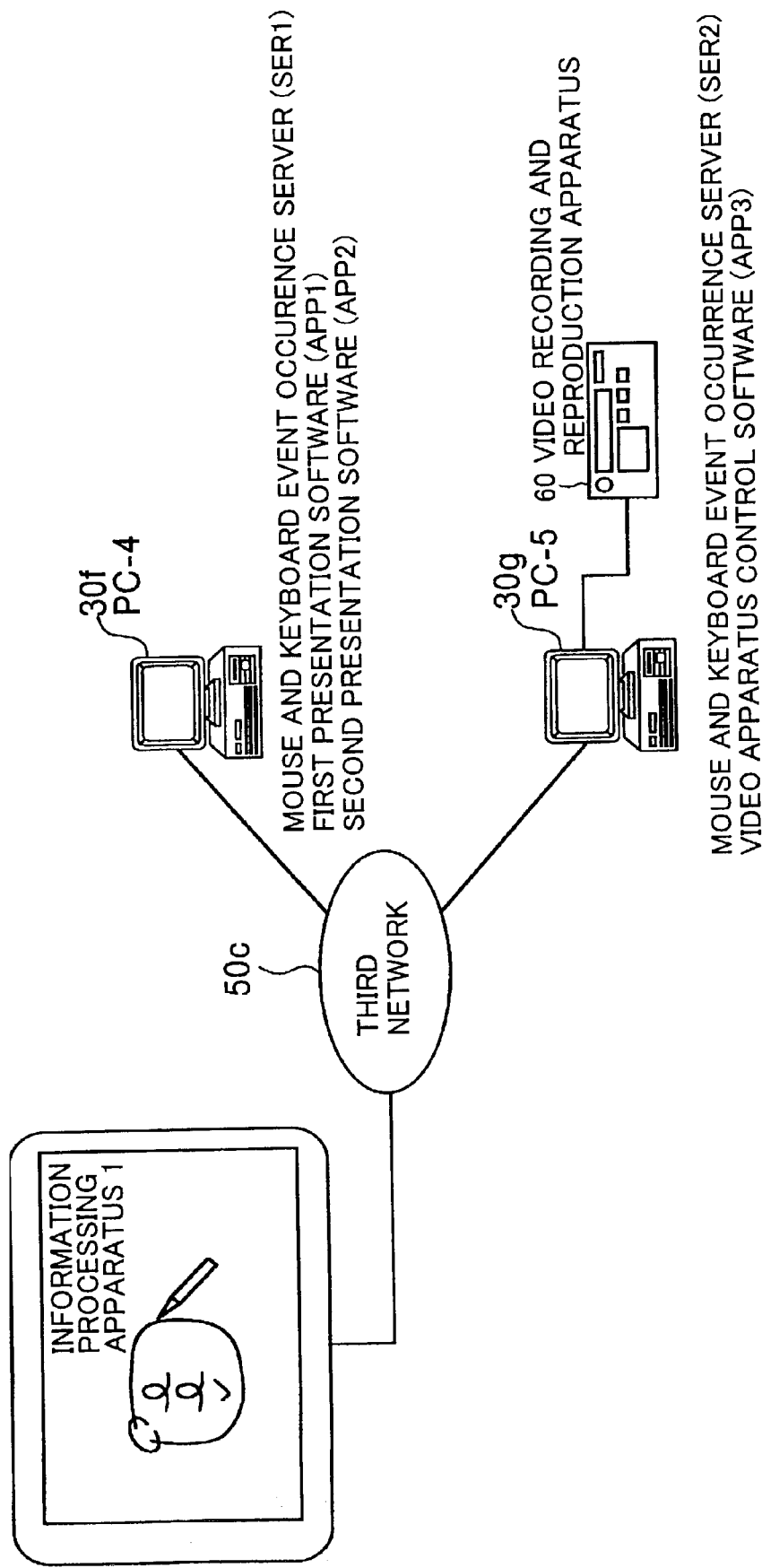
FIG. 17 is a diagram showing a system configuration in the case of performing a command transmission function of the command region according to the first embodiment of the present invention.

FIG. 17 is a diagram showing a system configuration in the case of performing the command transmission function of the command region. The information processing apparatus 1 of this embodiment is connected with a PC-4 30f and a PC-5 30g through a third network 50c. A mouse and keyboard event occurrence server SER1, first presentation software APP1, and second presentation software APP2 are activated on the PC-4 30f, and the first presentation software APP1 is focused on. Further, a mouse and keyboard event occurrence server SER2 and video apparatus control software APP3 are activated on the PC-5 30g. A video recording and reproduction apparatus 60 is connected to the PC-5 30g. The video recording and reproduction apparatus 60 has an RS-232-C-terminal connection interface so that its functions of recording, reproduction, fast-forwarding, and rewinding can be controlled from the PC-5 30g. A communication method between the information processing apparatus 1 and the SER1 and SER2 can be realized by using a well-known communication technology such as UDP (User Datagram Protocol). Further, a well-known method such as VISCA (Video System Control Architecture) is employed for the control method by the connection interface of the video recording and reproduction apparatus 60 and the RS-232-C standard. Therefore, a description of the configuration will be omitted.

Figure 19C:
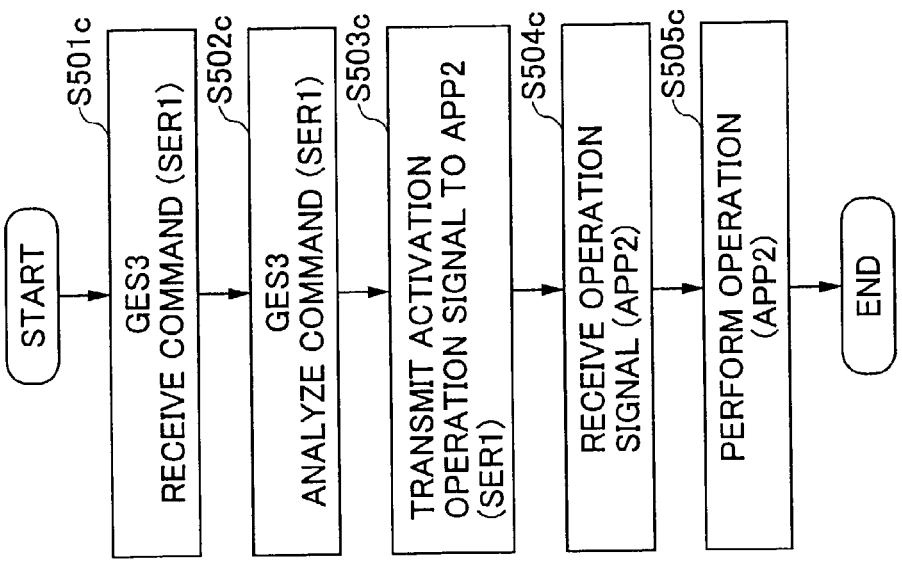
FIGS. 19A through 19C are flowcharts of the operation of the PC of FIG. 18.
Figure 19B:
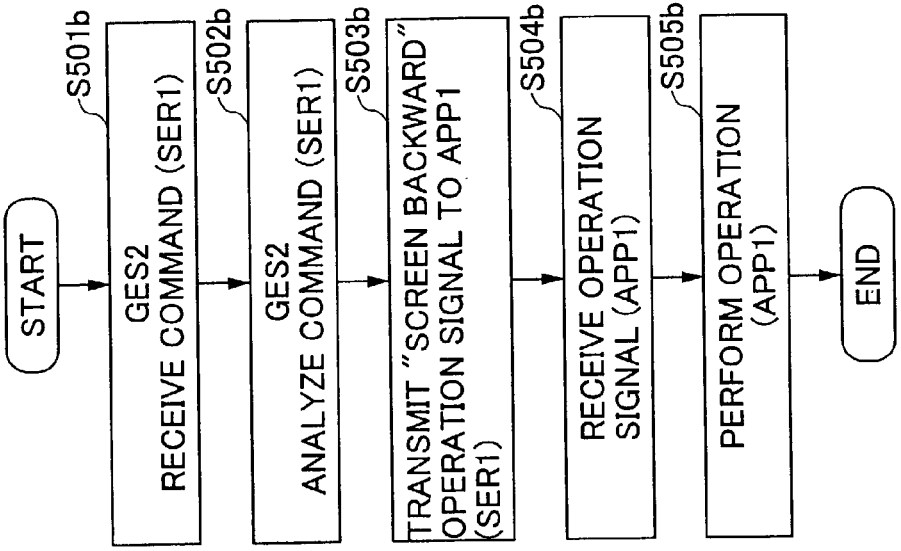
Figure 19A:
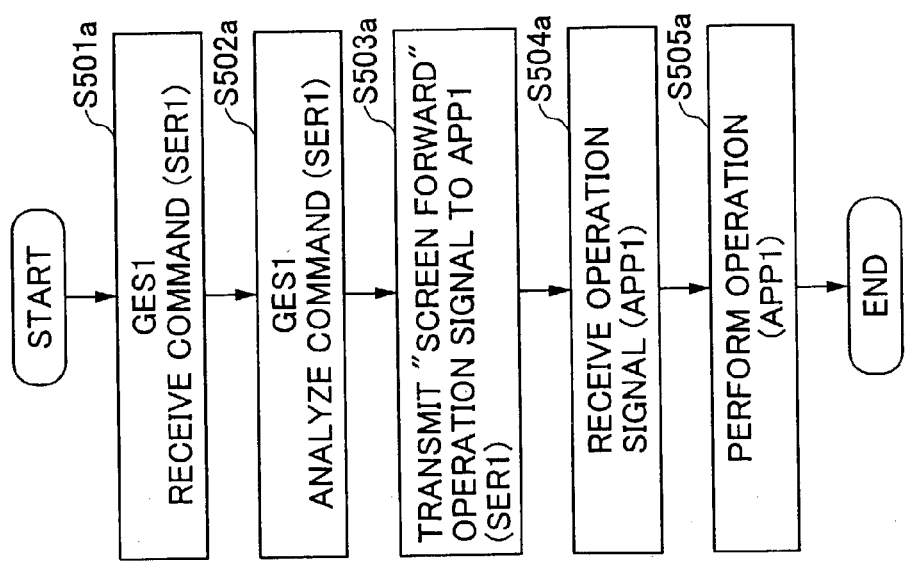

First, a description will be given, with reference to FIGS. 18 and 19A through 19C, of an operation of the PC-4 30f. FIG. 18 is a conceptual diagram showing how the PC-4 is specifically controlled in the case of transmitting a given command thereto by drawing the command region on the information processing apparatus 1. FIGS. 19A through 19C are flowcharts of the internal operations of the SER1, APP1, and APP2, respectively, each operating on the PC-4 side when the PC-4 is controlled as shown in FIG. 18.

In the case of FIG. 18, the destination of command transmission is determined to be the PC-4 30f when the number of self-crossings sc of the tag region is one in determining the command region. At this point, three commands of "screen forward" (GES1) "screen backward" (GES2), and "application change" (GES3) are transmitted to the PC-4 30f. In this case, specifically, a screen A of the APP1 is switched to a screen B by the GES1 command on the display screen of the PC-4 30f. Next, the screen B of the APP 1 is switched back to the screen A by the GES2 command. Further, the focus is shifted from the APP1 onto the APP2 by the GES3 command.

FIG. 19A is a flowchart of the operation performed when the command GES1 is transmitted from the information processing apparatus 1. FIG. 19B is a flowchart of the operation performed when the command GES2 is transmitted from the information processing apparatus 1. FIG. 19C is a flowchart of the operation performed when the command GES3 is transmitted from the information processing apparatus 1.

When the SER1 of the PC-4 30f receives the GES1 in step S501a of FIG. 19A, in step S502a, the SER1 analyzes the GES1, and in step S503a, the SER1 transmits the GES1 to the APP1 as a "screen forward" operation signal. In step S504a, the APP1 receives the operation signal, and in step S505a, the APP1 executes the command (or performs the operation specified by the command) so as to actually move the screen forward. Thereafter, likewise, steps S501b through S505b are performed so that the screen of the APP1 is moved backward to the previous one. Next, when the SER1 receives the GES3 in step S501c, in step S502c, the SER1 analyzes the GES3, and in step S503c, the SER1 transmits to the APP2 an operation signal to activate the APP2. When the APP2 receives the operation signal in step S504c, in step S505c, the APP2 executes the command (or performs the operation specified by the command) and becomes active. Thereby, it is just like the application is switched from the APP1 to the APP2. Thus, by drawing a predetermined command in the command region of the information processing apparatus 1, application software in the PC terminal can be remote-controlled.

Figure 20:
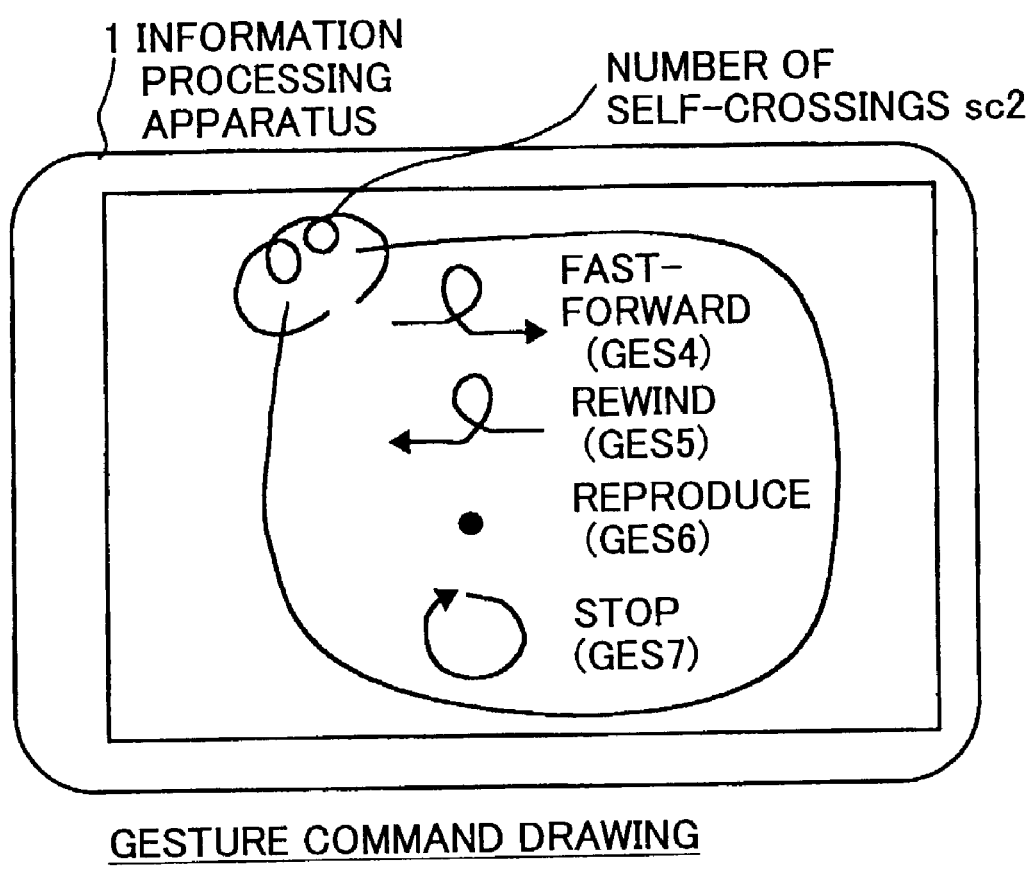
FIG. 20 is a diagram showing commands in the case of controlling a video recording and reproduction apparatus connected to another PC of FIG. 17.

FIG. 20 shows commands in the case of controlling the video recording and reproduction apparatus 60 connected to the PC-5 30g of FIG. 17 by drawing command gestures in the command region drawn on the information processing apparatus 1. The destination of command transmission is determined to be the PC-5 30g when the number of self-crossings sc of the tag region is two in determining the command region. At this point, gesture commands such as "fast-forward" (GES4), "rewind" (GES5), "reproduce" (GES6), and "stop" (GES7) are defined as commands for controlling the video recording and reproduction apparatus 60. Thereby, when any of the gesture commands is drawn in the command region for command transmission, the video recording and reproduction apparatus 60 can be remote-controlled accordingly. Much more control gesture commands may be prepared, and the gesture strokes relating the commands may be related to other gesture stroke shapes.

Figure 21:
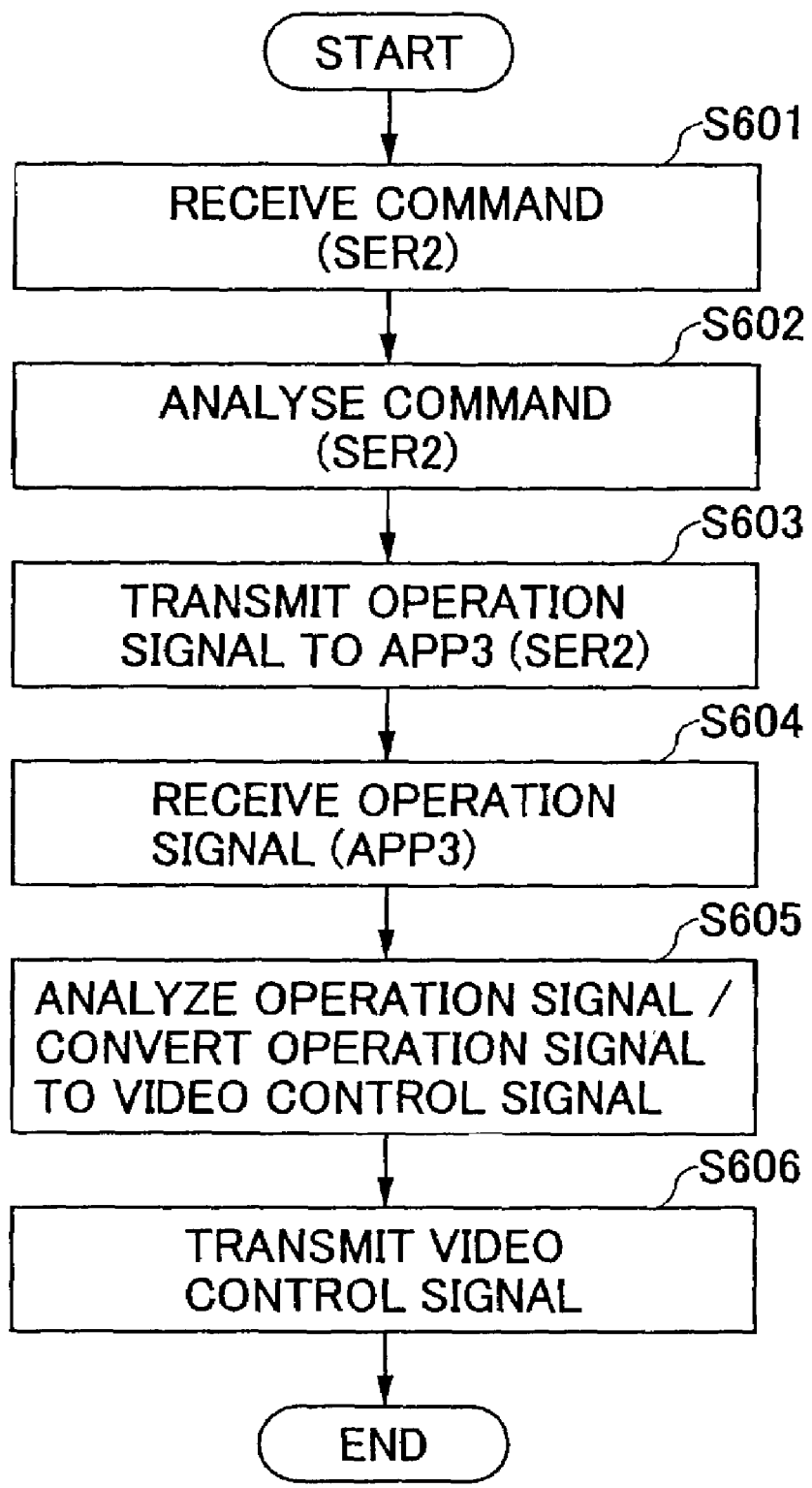
FIG. 21 is a flowchart of an operation of controlling the other PC of FIG. 17 by any of the commands of FIG. 20.

FIG. 21 is a flowchart of controlling of the PC-5 30g of FIG. 17. When a video control command is transmitted from the information processing apparatus 1 to the PC-5 30g, in step S601, the SER2 operating on the PC-5 30g receives the command. In step S602, the SER2 analyzes the command, and in step S603, the SER2 transmits an operation signal corresponding to the command to the video apparatus control software APP3. In step S604, the APP3 receives the operation signal, and in step S605, the APP3 converts the operation signal to a signal for controlling the video recording and reproduction apparatus 60 connected to the PC-5 30g by RS-232-C. Then, in step S606, the APP3 transmits the video control signal to the video recording and reproduction apparatus 60 through an R-232-C terminal. Thus, by drawing a given command in the command region of the information processing apparatus 1, the video of the video recording and reproduction apparatus 60 can be controlled.

Although the command gestures GES1 and GES2 of FIG. 18 are equal to the command gestures GES4 and GES5 of FIG. 20, respectively, the command gestures GES1 and GES4 cause different operations and the command gestures GES2 and GES5 cause different operations. This is because even when the GES1 and GES4 cause the same command of "right arrow key" to be transmitted from the information processing apparatus 1 so that the SER1 of the PC-4 30f and the SER2 of the PC-5 30g transmit the same "right arrow key" operation signal, the APP1 and the APP2 of the PC-4 30f and the APP3 of the PC-5 30g have different operation performing environments after receiving the operation signal. For instance, when "right arrow key" is input to the presentation software APP1 or APP2, the screen is moved forward to the next page. On the other hand, when "right arrow key" is input to the video apparatus control software APP3, the APP3 transmits a "fast-forward" control signal to the video recording and reproduction apparatus 60 connected to the PC-5 30g through a serial port.

Figure 22A:
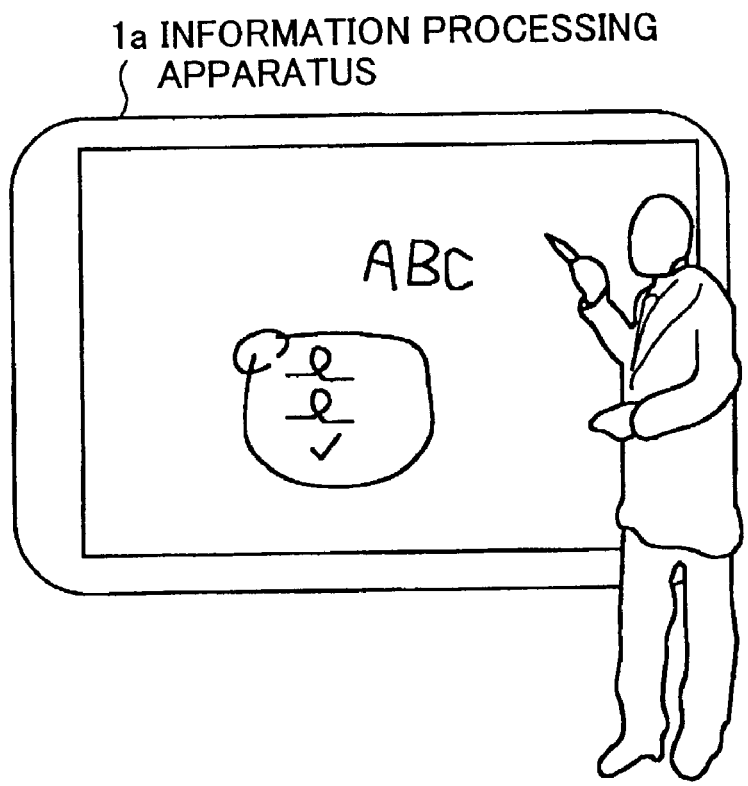
FIGS. 22A through 22C are diagrams showing variations of the information processing apparatus of FIG. 1.
Figure 22B:
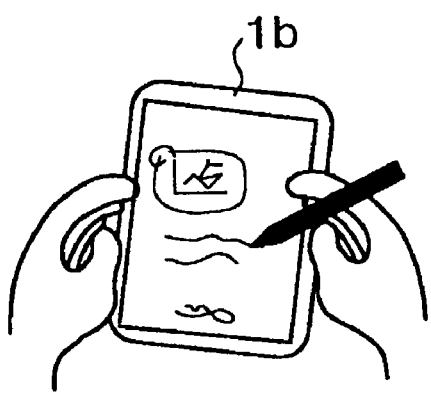
Figure 22C:
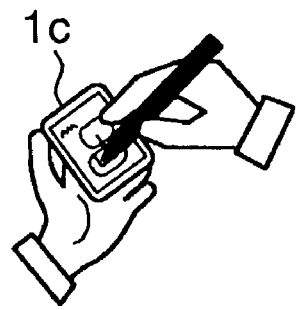

The input part of the information processing apparatus 1 of this embodiment is not limited to the above-described electronic blackboard unit 10. Any apparatus having the above-described coordinate input function can be used as the input part of the information processing apparatus 1. FIGS. 22A through 22C are diagrams showing variations of the electronic blackboard unit 10 of the information processing apparatus 1 of this embodiment.

That is, the information processing apparatus 1 may be configured as an electronic blackboard as an information processing apparatus 1a of FIG. 22A. In FIG. 22B, a pen tablet device is employed for the input part of an information processing apparatus 1b. In FIG. 22C, a hand-held device is used for the input part of an information processing apparatus 1c. Thus, a variety of apparatuses can be used as the electronic blackboard unit 10 or the input part of the information processing apparatus 1 of this embodiment irrespective of their sizes.

It is natural that the present invention be carried out by special hardware. However, the present invention may be implemented by software by using a conventional computer. That is, a program for performing the above-described operations such as stroke transmission and command transmission is installed in a computer to be executable. The program may be provided, preinstalled in a hard disk 210 as a recording medium housed in a computer 200a as shown in FIG. 23A.

Figure 23B:
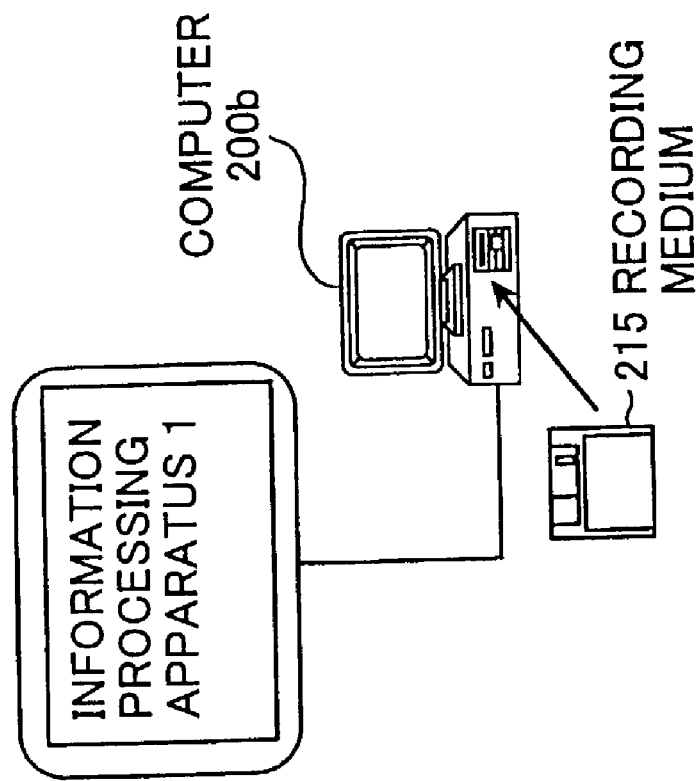
FIGS. 23A through 23D are diagrams showing configurations of the present invention in the case of realizing the present invention by software.
Figure 23A:
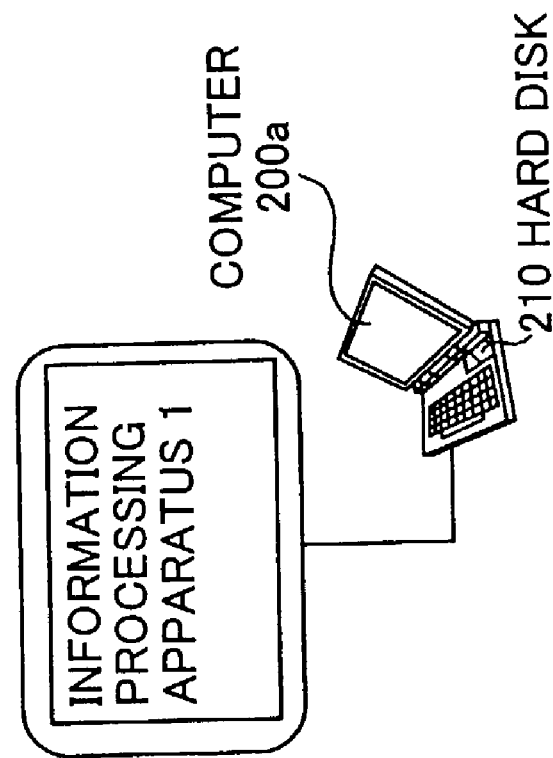

As shown in FIG. 23B, the program may be temporarily or permanently stored in a recording medium 215 so as to be incorporated into a computer 200b as a unit or used as a removable recording medium. Thereby, the program may be provided as package software.

Figure 23D:
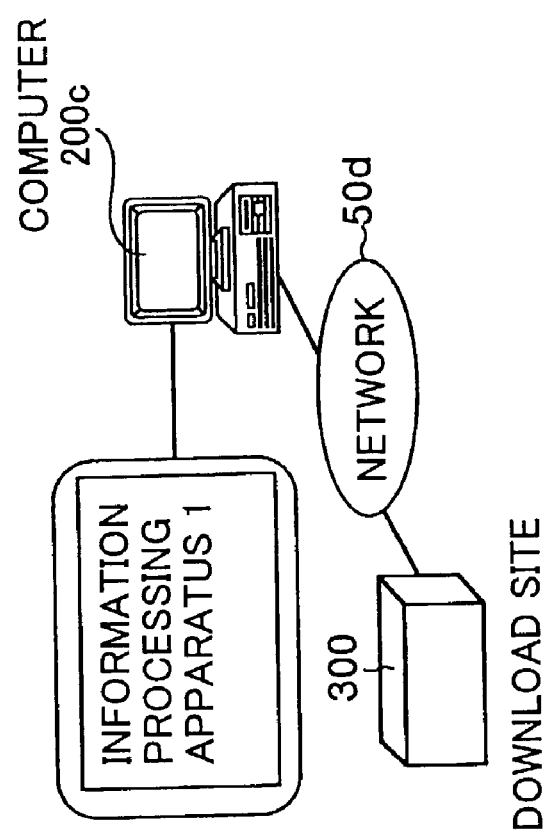
Figure 23C:
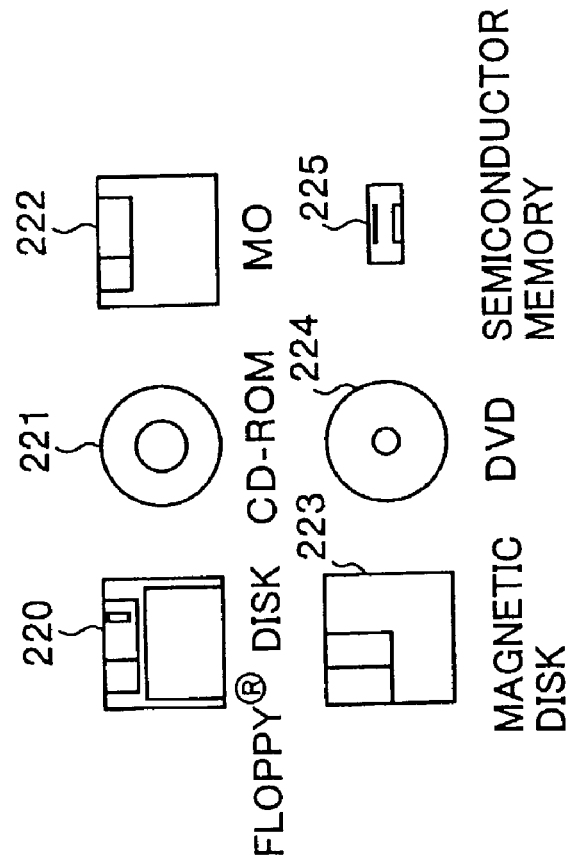

As recording media for storing the program, a floppy® disk 220, a CD-ROM (Compact Disk Read Only Memory) 221, an MO (magneto-optical) disk 222, a DVD (Digital Versatile Disk) 223, a magnetic disk 224, and a semiconductor memory 225 may be used as shown in FIG. 23C, for instance.

Further, as shown in FIG. 23D, the program may be transferred by radio or wire from a download site 300 to a computer 200c through a network 50d such as a LAN (Local Area Network) or the Internet so as to be downloaded to the built-in hard disk of the computer 200c.

[Second Embodiment]

A description will be given of a second embodiment of the present invention. In addition to the components of the information processing apparatus 1 of the first embodiment, an information processing apparatus according to the second embodiment of the present invention further includes an attribute information presentation part that presents attribute information attached to the command region when the electronic blackboard unit 10 detects at least one of coordinate points inside the tag region described in the first embodiment.

Figure 24:
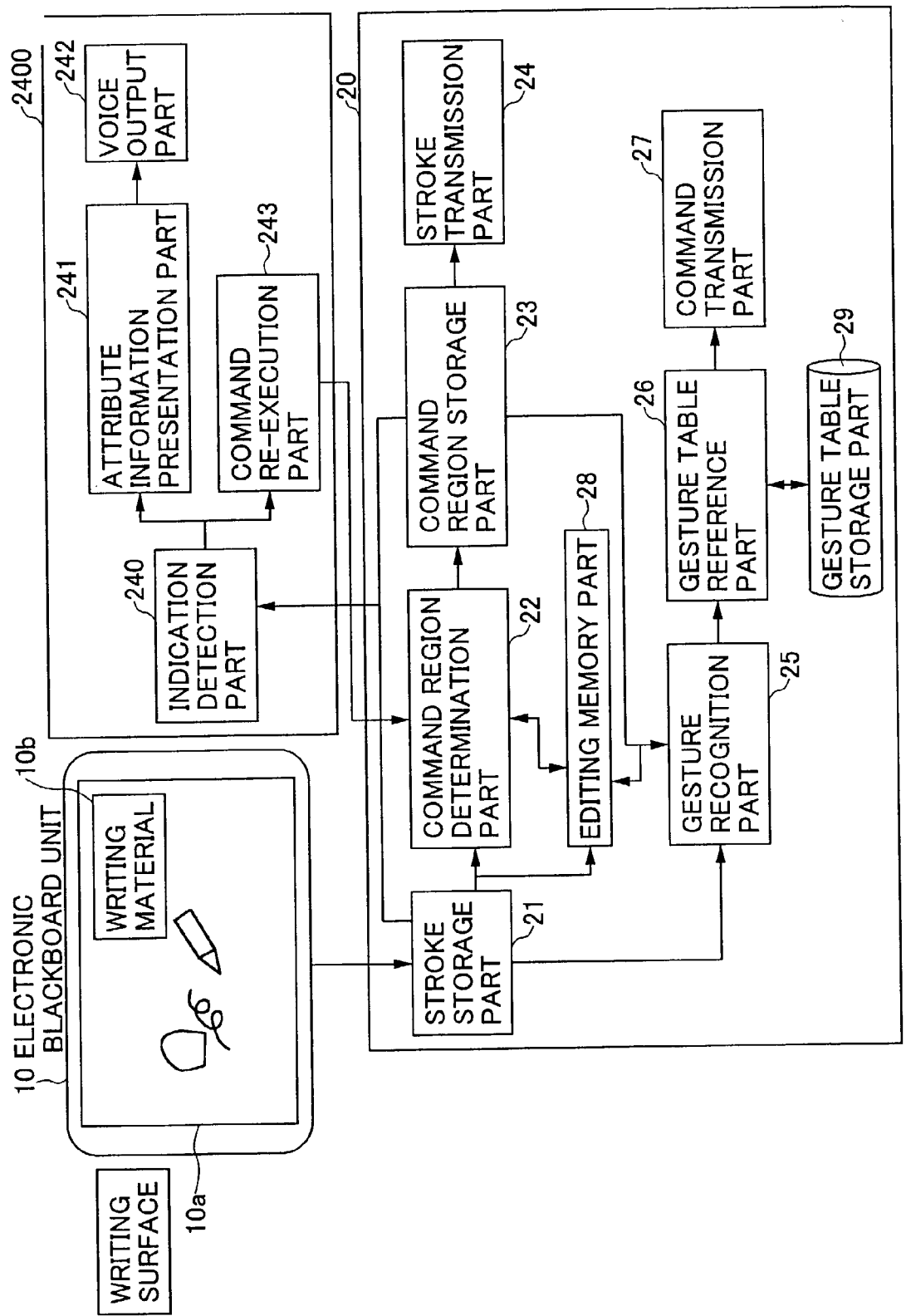
FIG. 24 is a block diagram showing an information processing apparatus according to a second embodiment of the present invention.

FIG. 24 is a block diagram showing the information processing apparatus of the second embodiment of the present invention. In FIG. 24, the same elements as those described in the first embodiment are referred to by the same numerals, and a description thereof will be omitted.

The information processing apparatus of the second embodiment includes the electronic blackboard unit 10, the central control unit 20, and an information presentation and re-execution part 2400. The information presentation and re-execution part 2400 is an attribute information presentation part presenting attribute information attached to the command region. The information presentation and re-execution part 2400 includes an indication detection part 240, an attribute information presentation part 241, a voice output part 242, and a command re-execution part 243. The indication detection part 240 detects an indication of a coordinate point in the tag region by a pen. The attribute information presentation part 241 presents as a sentence attribute information corresponding to the tag region including the coordinate point detected by the indication detection part 240. The voice output part 242 outputs the attribute information expressed as a sentence by the attribute information presentation part 241 as voice. The command re-execution part 243 re-outputs, to the outside, data determined based on the input timing of coordinates detected in the command region and on the array of the coordinates when the electronic blackboard unit 10 successively detects at least two of coordinate points inside the tag region.

A description will be given of an operation of the information processing apparatus of the second embodiment. The electronic blackboard unit 10 detects positions where the writing material 10b comes into contact with the writing surface 10a, thereby detecting inputs of coordinates to the writing surface 10a. The coordinate data indicating the detected positions are output to the central control unit 20 through RS-232-C serial communication.

The coordinate data are input to the stroke storage part 21 of the central control unit 20. The stroke storage part 21 successively stores the input coordinates (coordinate points) and strokes formed by arranging the input coordinates. Stroke data indicating the stored strokes are input to the command region determination part 22. The command region determination part 22 determines from the stroke data whether the starting and end points of a first one of two successive strokes is included in the closed region part of the second one of the two successive strokes. If the starting and end points of the first stroke are included in the closed region part of the second stroke, the closed region part of the first stroke is determined to be the command region, and the closed region part of the second stroke is determined to be the tag region.

Next, the command region storage part 23 stores the stroke data inside the command region. The stroke transmission part 24 transmits the stored stroke data to a destination specified by the tag region.

In the information processing apparatus of the second embodiment, a stroke-indicating signal output from the stroke storage part 21 to the command region storage part 23 is also input to the information presentation and re-execution part 2400. In the second embodiment, it is determined whether the indication detection part 240 detects at least one of the coordinate points in the tag region in the following manner, and when a click is made in the tag region, the indication detection part 240 informs the attribute information presentation part 241 of the clicking. The indication detection part 240 determines that a click is made when coordinates arranged on a stroke included in the tag region satisfy the following conditions:

(a) all of the coordinates of the points constituting the stroke are located inside the second stroke forming the tag region;

(b) the number of the points forming the stroke is smaller than or equal to a predetermined number;

(c) the inter-point distance of the stroke is smaller than or equal to a predetermined distance; and (d) time required between the contact of the writing material 10b with the writing surface 10a and the release of the writing material 10b from the writing surface 10a is shorter than a predetermined period.

Figure 25A:
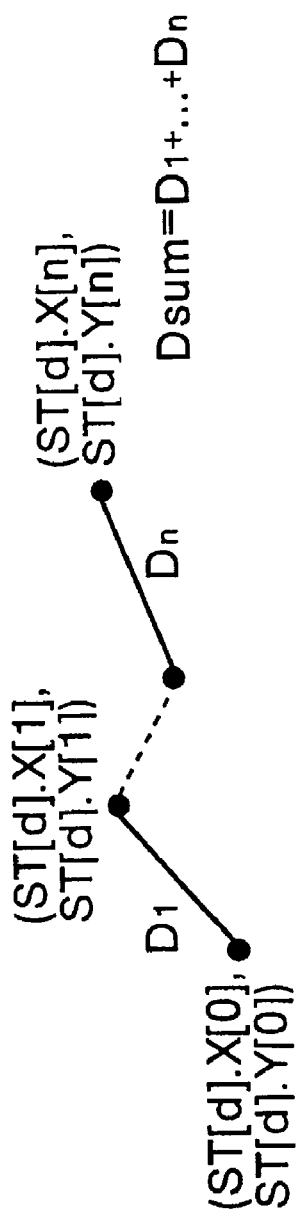
FIGS. 25A through 25C are diagrams for illustrating conditions for determining the coordinate points of a stroke included in the tag region to be a click according to the second embodiment of the present invention.
Figure 25B:
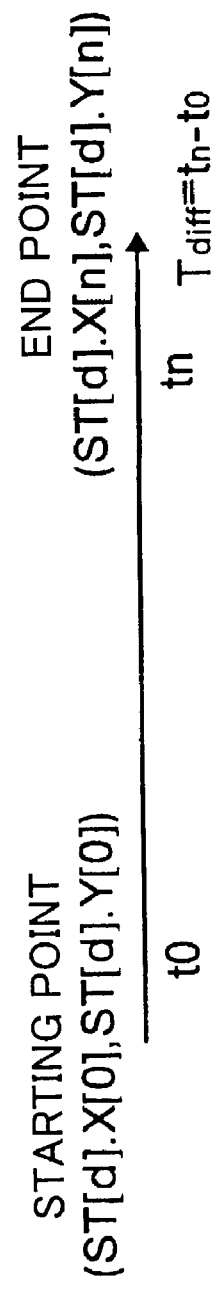
Figure 25C:
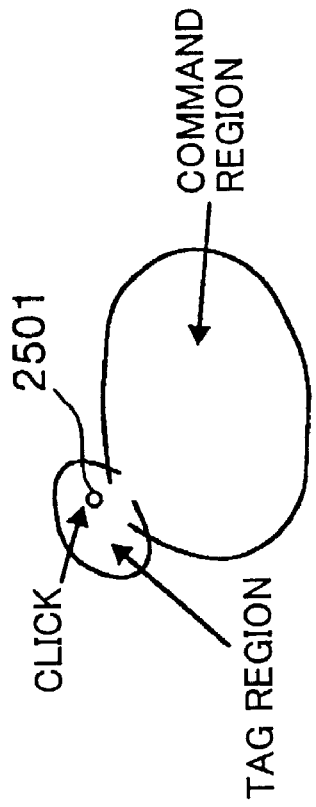

FIG. 25A is a diagram for illustrating the distance between each two successive points of the stroke. FIG. 25B is a diagram for illustrating the time required for the writing material 10b to be released from the writing surface 10a after the contact therewith. FIG. 25C is a diagram showing a graphic drawn by the stroke satisfying the above-described conditions (a) through (d).

With respect to the condition (c), that the inter-point distance of the stroke is smaller than or equal to a predetermined distance means, for instance, that a distance Dsum that is the sum of the inter-point distances $D_1$ through $D_n$ of a stroke ST[d] calculated from the coordinates of the points forming the stroke ST[d] is smaller than or equal to the predetermined distance. In the second embodiment, this state may also be described as "the inter-point distance of a stroke is sufficiently small." Here, an inter-point distance refers to the distance between two successive points of a stroke.

Further, with respect to the condition (d), whether time required between the contact of the writing material 10b with the writing surface 10a and the release of the writing material 10b from the writing surface 10a is shorter than a predetermined period is determined in the following manner. As shown in FIG. 25B, first, the indication detection part 240 acquires from a timer (not shown in the drawing) a time t0 at which the starting point (ST[d].X[0], ST[d].Y[0]) of the stroke ST[d] is input. Then, the indication detection part 240 acquires a time tn at which the end point (ST[d].X[n], ST[d].Y[n]) of the stroke ST[d] is input. Thereafter, the indication detection part 240 calculates a period Tdiff that is the difference between the time t0 and the time tn. If the period Tdiff is shorter than the predetermined period, it is determined that the time required by the writing material 10b to be released from the writing surface 10a after the contact therewith is shorter than the predetermined period. This state may also be described as "time required by the writing material 10b to be released from the writing surface 10a after the contact therewith is sufficiently short."

When the stroke in the tag region satisfies the above-described conditions, the stroke is drawn as a click 2501 as shown in FIG. 25C.

Figure 26:
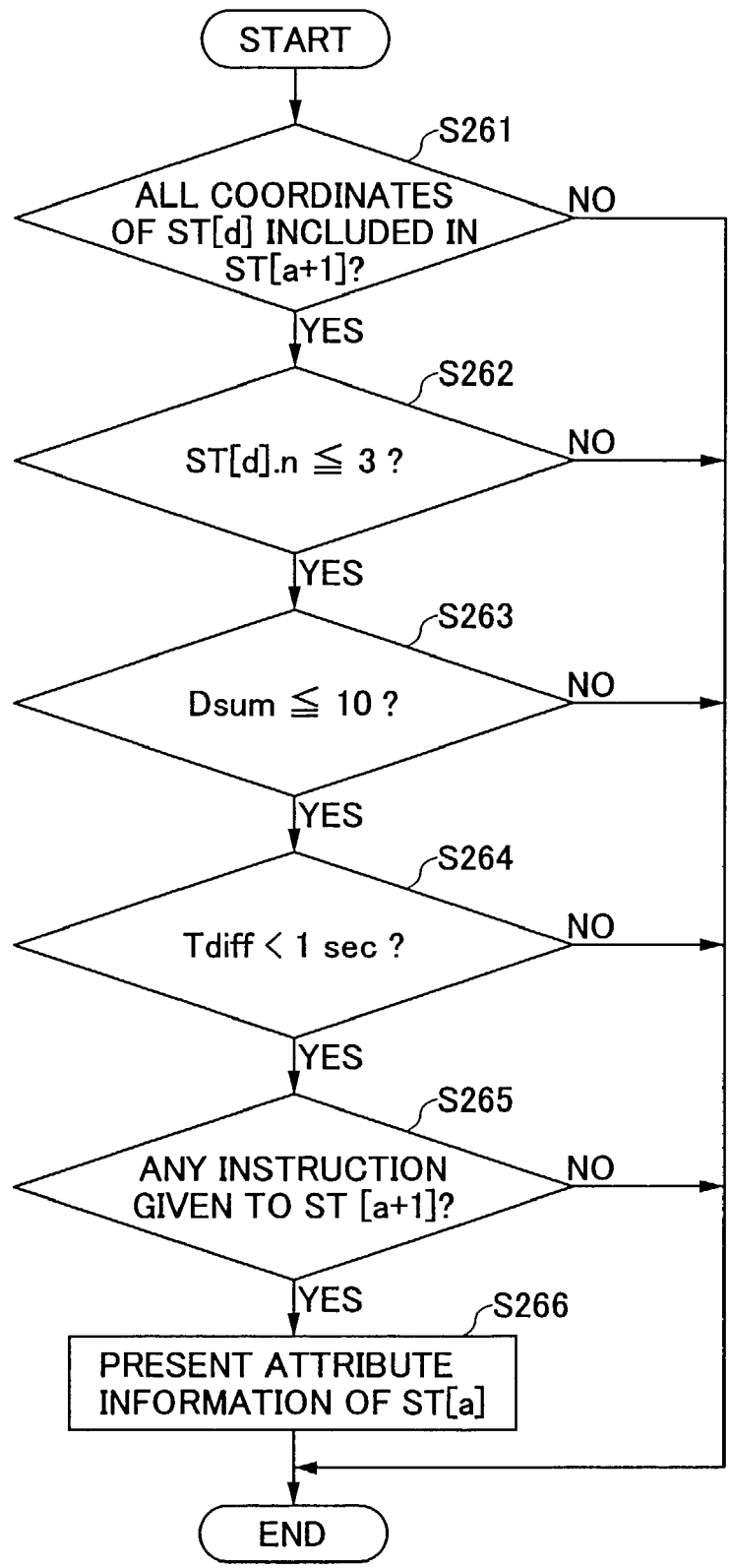
FIG. 26 is a flowchart of an operation of determining whether a click is made in the tag region according to the second embodiment of the present invention.

FIG. 26 is a flowchart of the operation of the information processing apparatus of the second embodiment determining from a stroke in the tag region that a click is made therein. In the flowchart of FIG. 26, a stroke indicating the command region is expressed as ST[a], a stroke indicating the tag region for the command region is expressed as ST[a+1], and the stroke formed in the tag region is expressed as ST[d].

In step S261 of FIG. 26, the indication detection part 240 determines whether all of the coordinates of the points (0 through N) forming the ST[d] are included in the ST[a+1]. As a result of the determination, if all of the coordinates of the points (0 through N) are included in the ST[a+1] (or "YES" in step S261), in step S262, the indication detection part 240 determines whether ST[d].n$\leq$3, that is, whether the number of the points forming the ST[d] is smaller than or equal to three.

If it is determined in step S262 that the number of the points forming the ST[d] is smaller than or equal to three (or "YES" in step S262), in step S263, it is determined whether the distance Dsum of the inter-point distances of the three points is smaller than or equal to, for instance, ten (a value based on a predetermined unit length). If the distance Dsum is smaller than or equal to ten (or "YES" in step S263), in step S264, it is determined whether the period Tdiff required for the writing material 10b to be released from the writing surface 10a after contacting the writing surface 10a for drawing the ST[d] is shorter than one second.

If it is determined in step S264 that the period Tdiff is shorter than one second (or "YES" in step S264), in step S265, it is determined whether any instruction (designation of a stroke or command data destination) is given to the ST[a+1] indicating the tag region. As a result, if it is determined that an instruction is given to the ST[a+1] (or "YES" in step S265), in step S266, attribute information attached to the ST[a] is presented to the operator.

In the case of "NO" in any of the above-described steps S261 through S266, the operation ends, so that it is determined that the ST[d] does not indicate a click.

When a click is made in the tag region, the attribute information presentation part 241 presents the attribute of the command region corresponding to the tag region. A description will be given below, using the structure data CR, of attribute presentation. That is, if a command region CR[i] corresponding to the stroke ST[a] of FIG. 3 is indicated by the click, for instance, character stings as shown below are temporarily substituted in a character string variable (string tmpBuf, for instance) in the attribute information presentation part 241.

```
if(CR[i].type==0){
    sprintf(tmpBuf,"Command region %d is for drawing transmission.",CR[i].stroke_id);
}else{
    if(CR[i].type==1){
    sprintf(temBuf,"Command region %d is for command transmission.",CR[i].stroke_id);
    }
```

In CR[i].type, it is specified whether the command region corresponding to the stroke ST[a] is for drawing transmission or command transmission. "0" is substituted in CR[i].type in the case of drawing transmission and "1" in the case of command transmission. The index number (a) of the stroke ST[a] forming the command region is substituted in CR[i].stroke_id. "Sprintf( )" is one of the character string operating functions of the C language. "Sprintf( )" substitutes, in compliance with a specified format, character strings specified by the second and succeeding arguments in a character string variable specified by the first argument. "% d" is a sign for outputting integer-type data as a character string.

The attribute information presentation part 241 transmits the above-described character strings substituted in tmpBuf to the voice output part 242. The voice output part 242 converts the character strings substituted in tmpBuf to voice and outputs the voice. As a result, the operator is presented with the attribute of the command region in voice. The voice may be synthesized by hardware or software. The voice synthesizing configuration is a well-known one such as a Microsoft® Text-To-Speech Engine, which is software for synthesizing voice from character strings. Therefore, a further detailed description of the voice synthesizing configuration will be omitted.

Further, the information processing apparatus of the second embodiment can add a character string variable for free description, such as "description", to the above-described structure data CR of the command region. A character string variable (attribute information) for describing the command region is added to "description" so that the contents added thereto may be presented to the operator in voice. The following is an example of the character string variable added to "description":

```
struct command_region{
    in type;
    int stroke_id;
    string hostname;
    string ip_address;
    int ser_port;
    int cli_port;
    string login_name;
    string passwd;
    string description;    /*added attribute information*/
    ...
}CR[CRmax];
```

The following contents may be provided as attribute information added to CR[i].description. In the following character string variables, "% s" is a sign for outputting character string-type data.

sprintf(CR[i].description, "This was used at the meeting B held on March 7$^{th}$ in the meeting room A.");

sprintf(tmpBuf, "The port % d of the server % s is to be used.% s",CR[i]hostname,CR[i].hostname,CR[i].ser_port, CR[i].description);

When the contents thus substituted in tmpBuf are output to the voice output part 242, the voice output part 242 performs voice synthesizing in a voice synthesizer (not shown in the drawing) and presents the operator with the attribute information in voice.

Further, according to the information processing apparatus of the second embodiment, when the electronic blackboard unit 10 successively detects at least two of the coordinate points in the tag region within a predetermined period of time, the stroke transmission part 24 or the command transmission part 27, which is the data transmission part of the information processing apparatus, re-transmits, to the outside, data determined based on the input timing and the array of the coordinate points detected in the command region.

That is, the information processing apparatus of the second embodiment determines that a double click has been made when the indication detection part 240 determines that clicks determined by the processing described with reference to FIG. 26 have been made successively within a predetermined period of time (approximately one second). Then, the indication detection part 240 transmits information indicating that the double click has been made to the command re-execution part 243.

When the command region CR[i] having the structure data CR is indicated by the double click in the tag region, the command re-execution part 243 determines whether the attribute of the CR[i] is for stroke (drawing) data transmission or for command transmission. This determination is performed by determining CR[i].type as follows:

```
if(CR[i].type==0){
        (stroke data transmission operation)
}else{
        if(CR[i].type==1){
                (command transmission operation)
        }
}
```

If CR[i].type is 0, that is, if the command region is for stroke data transmission, the command region determination part 22 determines the command region by the ST[a] and the tag region by the ST[a+1] Then, the stroke transmission part 24 re-transmits stroke data inside the command region to a destination specified by the tag region.

On the other hand, if the CR[i].type is 1, that is, the command region is for command transmission, the command re-execution part 243 informs the command region determination part 22 that the command region is for command transmission. The command region determination part 22 determines the command region by the ST[a] and the tag region by the ST[a+1]. Then, the command transmission part 27 transmits a command corresponding to a gesture stroke previously input in the command region to a destination specified by the tag region.

Figure 27:
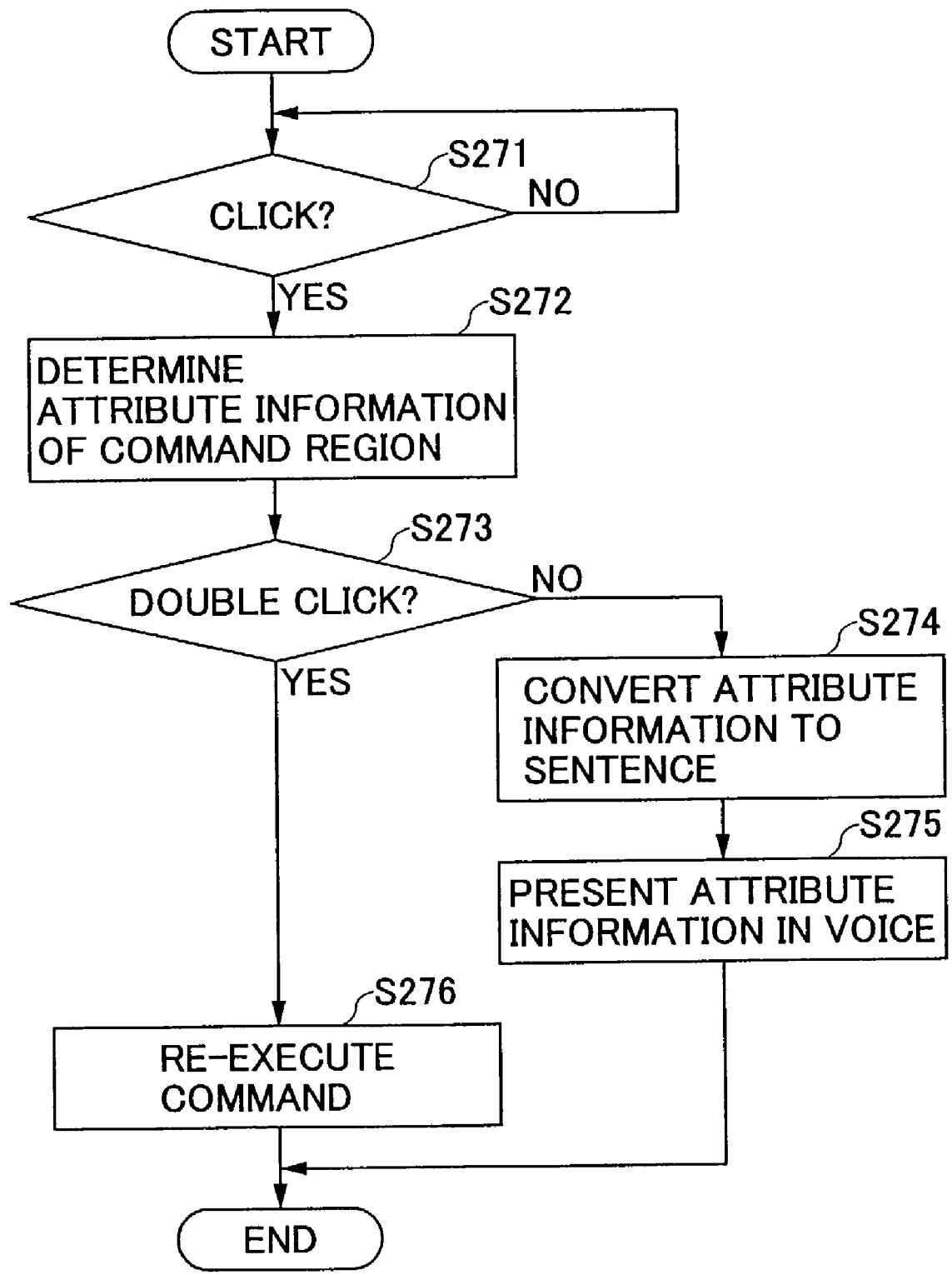
FIG. 27 is a flowchart for illustrating a method of controlling the information processing apparatus of FIG. 24 according to the second embodiment of the present invention.

FIG. 27 is a flowchart for illustrating a method of controlling the information processing apparatus of the second embodiment. A description will be given, with reference to FIG. 27, of the method of controlling the information processing apparatus of the second embodiment. In step S271 of FIG. 27, the indication detection part 240 determines by the operation described with reference to FIG. 26 whether a click has been made in the tag region. If it is determined as a result of the determination that no click has been made (or "NO" in step S271), the indication detection part 240 waits until a click is made.

If it is determined in step S271 that a click has been made (or "YES" in step S271), in step S272, the attribute information presentation part 241 determines the attribute of the command region determined by the command region determination part 22. Then, in step S273, the indication detection part 240 further determines whether the click is a double click. If the click is not a double click (or "NO" in step S273), in step S274, the attribute of the command region obtained by the determination of step S272 is converted to a sentence.

The attribute information converted to a sentence is input to the voice output part 242 to be converted to voice by the synthesizer (not shown in the drawing). Then, in step S275, the attribute of the command region is output in voice to be presented to the operator.

If it is determined in step S273 that the click is a double click (or "YES" in step S273), in step S276, a command to transmit stroke data or a command to transmit a command is re-executed in accordance with the attribute of the command region determined by the command region determination part 22. Thereafter, the operation ends.

According to the above-described information processing apparatus of the second embodiment, the attribute of the command region indicating, for instance, whether the command region is for command transmission or for stroke data transmission can be presented to the operator. Therefore, the operator can understand the function and the operation of the command region with accuracy after the command region is formed. Further, stroke data or a command can be transmitted by reusing the command region that has been already used. Therefore, the information processing apparatus can be operated in a simplified manner.

Each of the information processing apparatuses of the first and second embodiments includes a command region determination part determining a command region based on a stroke formed by an array of points indicated by coordinates input to a predetermined plane, and a data transmission part transmitting outside data determined based on the input timing and the array of coordinates in the command region.

According to the present invention, the operability of an information processing apparatus is increased for an operator who is not accustomed to using electronic information equipment, and data can be shared among a plurality of apparatuses.

Further, the command region can be specified by a stroke drawn on the screen of the electronic blackboard unit, and stroke information inside the command region can be stored and transmitted outside. A command can also be transmitted by a gesture stroke. This promotes sharing of information put on the electronic blackboard unit at a conference or presentation. Further, electronic apparatuses used at a conference or presentation can be operated by gestures. Therefore, the electronic apparatuses can be used effectively during a conference or presentation.

Further, the command region for stroke transmission can be configured easily by a stroke input from the electronic blackboard unit. Since special function switches are not necessarily required, the effects of the present invention can be produced by any electronic blackboard unit having the function of inputting coordinates even if the electronic blackboard unit is simple in configuration.

Further, the command region can be determined by detecting the closed region of a stroke by detecting the starting and end points of the stroke. Therefore, when the user transmits a given stroke, errors can be reduced in inputting the stroke forming the command region. Further, since the command region is drawn by a stroke, the user can easily recognize the command region by intuition.

Further, apparatuses to which a stroke or command is transmitted can be switched by determining the shape of the tag region for the command region. Therefore, stroke or command information can be transmitted not only to a single apparatus but also to a plurality of apparatuses, programs, and recording media. Thereby, a comprehensive operating environment can be provided among a plurality of electronic apparatuses at a conference or presentation.

Further, since the number of self-crossings of a stroke can be employed to determine the shape of the tag region, the amount of calculation in determining the shape of the tag region is decreased, and the user can input a desired tag region with certainty.

Further, attribute information attached to the command region can be presented. Therefore, the operator can also understand the state and the function of the command region after the command region is determined.

Further, since the attribute information can be presented in the form of a sentence, the attribute information is easy for the operator to understand.

Further, the attribute information in the form of a sentence can be presented in voice. Therefore, the attribute information can be presented so that the operator can understand the attribute information more easily.

Further, the command region can be used repeatedly after being initially formed.

The present invention is not limited to the specifically disclosed embodiments, but variations and modifications may be made without departing from the scope of the present invention.

The present application is based on Japanese priority applications No. 2001-285955 filed on Sep. 19, 2001, and No. 2002-251864 filed on Aug. 29, 2002, the entire contents of which are hereby incorporated by reference.

What is claimed is:

1. An information processing apparatus comprising:
a command region determination part configured to determine a command region based on a pattern of a stroke, wherein the stroke is formed by an array of points indicating coordinates input on a predetermined plane;
a data transmission part configured to transmit data to a predetermined destination, wherein the data to be transmitted is determined based on at least one of input timing of the coordinates and the stroke
a coordinate detection part configured to detect coordinates input to the predetermined plane; and
a stroke storage part configured to store arrays of the coordinates detected by said coordinate detection part as a stroke,
wherein:
said command region determination part determines whether first and second strokes stored in said stroke storage part satisfy a predetermined condition, and determines the command region and a tag region therefor based on the first and second strokes, respectively, when the first and second strokes satisfy the predetermined condition, said command region determination part further configured to determine whether a stroke is included in the command region and to determine the command region to be used for stroke transmission when a stroke is included in the command region; and
said data transmission part comprises a stroke transmission part configured to transmit stroke data inside the command region to a destination of stroke transmission which destination is determined by the tag region.

2. The information processing apparatus as claimed in claim 1, wherein said stroke transmission part transmits the stroke data to the destination of stroke transmission, the destination being specified by a shape of the second stroke determined to be the tag region.

3. The information processing apparatus as claimed in claim 2, wherein the shape of the second stroke varies depending on a number of self-crossings of the second stroke.

4. The information processing apparatus as claimed in claim 1, wherein said stroke transmission part transmits the stroke data as bit map data to an apparatus of the destination of stroke transmission.

5. The information processing apparatus as claimed in claim 1, wherein the first and second strokes are formed successively.

6. The information processing apparatus as claimed in claim 1, wherein said command region determination part determines, as the predetermined condition, whether a closed region of the second stroke includes a predetermined point of the first stroke, and determines whether a distance between the predetermined point of the first stroke and a predetermined point of the second stroke is smaller than or equal to a predetermined value when said command region determination part determines that the closed region of the second stroke includes the predetermined point of the first stroke.

7. The information processing apparatus as claimed in claim 1, wherein said command region determination part determines, as the predetermined condition, whether a difference between a time at which the first stroke is drawn and a time at which the second stroke is drawn is smaller than a predetermined period of time.

8. The information processing apparatus as claimed in claim 1, further comprising an attribute information presentation part configured to present attribute information attached to the command region when said coordinate detection part detects at least one of coordinate points inside the tag region.

9. The information processing apparatus as claimed in claim 8, wherein said attribute information presentation part comprises a sentence information output part configured to present the attribute information attached to the command region in the form of a sentence.

10. The information processing apparatus as claimed in claim 8, wherein said attribute information presentation part comprises a voice output part configured to convert the attribute information attached to the command region to a sentence and outputting the sentence as a voice.

11. The information processing apparatus as claimed in claim 1, wherein when said coordinate detection part successively detects at least two of coordinate points inside the tag region within a predetermined period of time, said data transmission part re-transmits, to the outside, the data determined based on the input timing and the arrays of the coordinates detected in the command region.

12. An information processing apparatus comprising:
a command region determination part configured to determine a command region based on a pattern of a stroke, wherein the stroke is formed by an array of points indicating coordinates input on a predetermined plane;
a data transmission part configured to transmit data to a predetermined destination, wherein the data to be transmitted is determined based on at least one of input timing of the coordinates and the stroke;
a coordinate detection part configured to detect coordinates input to the predetermined plane; and
a stroke storage part configured to store arrays of the coordinates detected by said coordinate detection part as a stroke,
wherein:
said command region determination part determines whether first and second strokes stored in said stroke storage part satisfy a predetermined condition, and determines the command region and a tag region therefor based on the first and second strokes, respectively, when the first and second strokes satisfy the predetermined condition, said command region determination part further configured to determine whether a stroke is included in the command region and configured to determine the command region to be used for command transmission when no stroke is included in the command region; and
said data transmission part comprises a command transmission part configured to transmit a predetermined command corresponding to a stroke of a predetermined shape generated inside the command region for command transmission to a destination of command transmission which destination is determined by the tag region.

13. The information processing apparatus as claimed in claim 12, wherein said command transmission part transmits the predetermined command to the destination of command transmission specified by a shape of the second stroke determined to be the tag region.

14. The information processing apparatus as claimed in claim 13, wherein the shape of the second stroke varies depending on a number of self-crossings of the second stroke.

15. The information processing apparatus as claimed in claim 12, further comprising:
a recognition part configured to recognize the stroke of the predetermined shape generated inside the command region for command transmission; and
a conversion part configured to convert the stroke of the predetermined shape to the predetermined command corresponding thereto.

16. The information processing apparatus as claimed in claim 12, wherein the predetermined command causes a predetermined event to occur in an apparatus of the destination of command transmission.

17. The information processing apparatus as claimed in claim 12, wherein the first and second strokes are formed successively.

18. The information processing apparatus as claimed in claim 12, wherein said command region determination part determines, as the predetermined condition, whether a closed region of the second stroke includes a predetermined point of the first stroke, and determines whether a distance between the predetermined point of the first stroke and a predetermined point of the second stroke is smaller than or equal to a predetermined value when said command region determination part determines that the closed region of the second stroke includes the predetermined point of the first stroke.

19. The information processing apparatus as claimed in claim 12, wherein said command region determination part determines, as the predetermined condition, whether a difference between a time at which the first stroke is drawn and a time at which the second stroke is drawn is smaller than a predetermined period of time.

20. The information processing apparatus as claimed in claim 12, further comprising an attribute information presentation part configured to present attribute information attached to the command region when said coordinate detection part detects at least one of coordinate points inside the tag region.

21. The information processing apparatus as claimed in claim 20, wherein said attribute information presentation part comprises a sentence information output part configured to present the attribute information attached to the command region in the form of a sentence.

22. The information processing apparatus as claimed in claim 20, wherein said attribute information presentation part comprises a voice output part configured to converting the attribute information attached to the command region to a sentence and outputting the sentence as a voice.

23. The information processing apparatus as claimed in claim 12, wherein when said coordinate detection part successively detects at least two of coordinate points inside the tag region within a predetermined period of time, said data transmission part re-transmits, to the outside, the data determined based on the input timing and the arrays of the coordinates detected in the command region.

24. A method of controlling an information processing apparatus comprising the steps of:
(a) determining a command region based on a pattern of a stroke, wherein the stroke is formed by an array of points indicating coordinates input on a predetermined plane; and (b) transmitting data to a predetermined destination, wherein the data to be transmitted is determined based on at least one of input timing of the coordinates detected and the stroke, wherein:

said step (a) comprises the steps of:

(c) determining whether starting and end points of a first stroke are included in a closed region of a second stroke, the first and second strokes each being formed of an array of successively input coordinate points;

(d) determining, when said step (c) determines that the starting and end points of the first stroke are included in the closed region of the second stroke, whether each of a distance between a line segment connecting the starting and end points of the first stroke and a starting point of the second stroke and a distance between a line segment connecting the starting and end points of the first stroke and an end point of the second stroke is smaller than or equal to a predetermined distance; and (e) determining the command region and a tag region therefor based on the first and second strokes, respectively, when said step (d) determines that each of the distances is smaller than or equal to the predetermined distance; and said step (b) comprises the steps of:

(f) determining whether a stroke is included in the command region, and determining the command region to be used for stroke transmission when it is determined that a stroke is included in the command region; and (g) transmitting stroke data inside the command region to a destination of transmission specified by the tag region.

25. The method as claimed in claim 24, further comprising the step of (h) presenting attribute information attached to the command region when at least one of coordinate points inside the tag region is detected.

26. The method as claimed in claim 25, wherein said step (h) presents the attribute information attached to the command region in the form of a sentence.

27. The method as claimed in claim 25, wherein said step (h) converts the attribute information attached to the command region to a sentence and outputs the sentence as a voice.

28. The method as claimed in claim 25, wherein said step (b) re-transmits, to the outside, the data determined based on the input timing and the arrays of the coordinates detected in the command region when at least two of the coordinate points inside the tag region are successively detected.

29. The method as claimed in claim 24, wherein the first and second strokes are successively formed on the predetermined plane.

30. A method of controlling an information processing apparatus, comprising the steps of:

(a) determining a command region based on a pattern of a stroke, wherein the stroke is formed by an array of points indicating coordinates input on a predetermined planet and (b) transmitting data to a predetermined destination, wherein the data to be transmitted is determined based on at least one of input timing of the coordinates detected and the stroke, wherein:

said step (a) comprises the steps of:

(c) determining whether starting and end points of a first stroke are included in a closed region of a second stroke, the first and second strokes each being formed of an array of successively input coordinate points;

(d) determining, when said step (c) determines that the starting and end points of the first stroke are included in the closed region of the second stroke, whether each of a distance between a line segment connecting the starting and end points of the first stroke and a starting point of the second stroke and a distance between a line segment connecting the starting and end points of the first stroke and an end point of the second stroke is smaller than or equal to a predetermined distance; and (e) determining the command region and a tag region therefor based on the first and second strokes, respectively, when said step (d) determines that each of the distances is smaller than or equal to the predetermined distance; and said step (b) comprises the steps of:

(f) determining whether a stroke is included in the command region, and determining the command region to be used for command transmission when it is determined that no stroke is included in the command region;

(g) recognizing a stroke of a predetermined shape generated inside the command region for command transmission;

(h) converting the recognized stroke to a predetermined command corresponding thereto; and (i) transmitting the predetermined command to a destination of transmission specified by the tag region.

31. The method as claimed in claim 30, further comprising the step of (j) presenting attribute information attached to the command region when at least one of coordinate points inside the tag region is detected.

32. The method as claimed in claim 31, wherein said step (j) presents the attribute information attached to the command region in the form of a sentence.

33. The method as claimed in claim 31, wherein said step (j) converts the attribute information attached to the command region to a sentence and outputs the sentence as a voice.

34. The method as claimed in claim 31, wherein said step (b) re-transmits, to the outside, the data determined based on the input timing and the arrays of the coordinates detected in the command region when at least two of the coordinate points inside the tag region are successively detected.

35. The method as claimed in claim 30, wherein the first and second strokes are successively formed on the predetermined plane.

36. A computer program embodied in a computer readable medium for performing in an information processing apparatus the steps of:

(a) determining a command region based on a pattern of a stroke, wherein the stroke is formed by an array of points indicating coordinates input on a predetermined plane; and (b) transmitting data to a predetermined destination, wherein the data to be transmitted is determined based on at least one of input timing of the coordinates and the stroke, wherein:

said step (a) comprises the steps of:

(c) determining whether starting and end points of a first stroke are included in a closed region of a second stroke, the first and second strokes each being formed of an array of successively input coordinate points;

(d) determining, when said step (c) determines that the starting and end points of the first stroke are included in the closed region of the second stroke, whether each of a distance between a line segment connecting the starting and end points of the first stroke and a starting point of the second stroke and a distance between a line segment connecting the starting and end points of the first stroke and an end point of the second stroke is smaller than or equal to a predetermined distance; and (e) determining the command region and a tag region therefor based on the first and second strokes, respectively, when said step (d) determines that each of the distances is smaller than or equal to the predetermined distance; and said step (b) comprises the steps of:

(f) determining whether a stroke is included in the command region, and determining the command region to be used for stroke transmission when it is determined that a stroke is included in the command region; and (g) transmitting stroke data inside the command region to a destination of transmission specified by the tag region.

37. The program as claimed in claim 36, wherein the method further comprises the step of (h) presenting attribute information attached to the command region when at least one of coordinate points inside the tag region is detected.

38. The program as claimed in claim 37, wherein said step (h) presents the attribute information attached to the command region in the form of a sentence.

39. The program as claimed in claim 37, wherein said step (h) converts the attribute information attached to the command region to a sentence and outputs the sentence as a voice.

40. The program as claimed in claim 37, wherein said step (b) re-transmits, to the outside, the data determined based on the input timing and the arrays of the coordinates detected in the command region when at least two of the coordinate points inside the tag region are successively detected.

41. The program as claimed in claim 36, wherein the first and second strokes are successively formed on the predetermined plane.

42. A computer program embodied in a computer readable medium for performing in an information processing apparatus the steps of:

(a) determining a command region based on a pattern of a stroke, wherein the stroke is formed by an array of points indicating coordinates input on a predetermined plane; and (b) transmitting data to a predetermined destination, wherein the data to be transmitted is determined based on at least one of input timing of the coordinates and the stroke, wherein:

said step (a) comprises the steps of:

(c) determining whether starting and end points of a first stroke are included in a closed region of a second stroke, the first and second strokes each being formed of an array of successively input coordinate points;

(d) determining, when said step (c) determines that the starting and end points of the first stroke are included in the closed region of the second stroke, whether each of a distance between a line segment connecting the starting and end points of the first stroke and a starting point of the second stroke and a distance between a line segment connecting the starting and end points of the first stroke and an end point of the second stroke is smaller than or equal to a predetermined distance; and (e) determining the command region and a tag region therefor based on the first and second strokes, respectively, when said step (d) determines that each of the distances is smaller than or equal to the predetermined distance; and said step (b) comprises the steps of:

(f) determining whether a stroke is included in the command region, and determining the command region to be used for stroke transmission when it is determined that a stroke is included in the command region; and be used for command transmission when it is determined that no stroke is included in the command region;

(g) recognizing a stroke of a predetermined shape generated inside the command region for command transmission;

(h) converting the recognized stroke to a predetermined command corresponding thereto; and (i) transmitting the predetermined command to a destination of transmission specified by the tag region.

43. The program as claimed in claim 42, wherein the method further comprises the step of (j) presenting attribute information attached to the command region when at least one of coordinate points inside the tag region is detected.

44. The program as claimed in claim 43, wherein said step (j) presents the attribute information attached to the command region in the form of a sentence.

45. The program as claimed in claim 43, wherein said step (j) converts the attribute information attached to the command region to a sentence and outputs the sentence as a voice.

46. The program as claimed in claim 43, wherein said step (b) re-transmits, to the outside, the data determined based on the input timing and the arrays of the coordinates detected in the command region when at least two of the coordinate points inside the tag region are successively detected.

47. The program as claimed in claim 42, wherein the first and second strokes are successively formed on the predetermined plane.

48. A computer-readable medium storing a program for performing in an information processing apparatus the steps of:

(a) determining a command region based on a pattern of a stroke, wherein the stroke is formed by an array of points indicating coordinates input on a predetermined plane; and (b) transmitting data to a predetermined destination, wherein the data to be transmitted is determined based on at least one of input timing of the coordinates and the stroke, wherein:

said step (a) comprises the steps of:

(c) determining whether starting and end points of a first stroke are included in a closed region of a second stroke, the first and second strokes each being formed of an array of successively input coordinate points;

(d) determining, when said step (c) determines that the starting and end points of the first stroke are included in the closed region of the second stroke, whether each of a distance between a line segment connecting the starting and end points of the first stroke and a starting point of the second stroke and a distance between a line segment connecting the starting and end points of the first stroke and an end point of the second stroke is smaller than or equal to a predetermined distance; and (e) determining the command region and a tag region therefor based on the first and second strokes, respectively, when said step (d) determines that each of the distances is smaller than or equal to the predetermined distance; and said step (b) comprises the steps of:

(f) determining whether a stroke is included in the command region, and determining the command region to be used for stroke transmission when it is determined that a stroke is included in the command region; and (g) transmitting stroke data inside the command region to a destination of transmission specified by the tag region.

49. The computer-readable medium as claimed in claim 48, wherein the method further comprises the step of (h) presenting attribute information attached to the command region when at least one of coordinate points inside the tag region is detected.

50. The computer-readable medium as claimed in claim 49, wherein said step (h) presents the attribute information attached to the command region in the form of a sentence.

51. The computer-readable medium as claimed in claim 49, wherein said step (h) converts the attribute information attached to the command region to a sentence and outputs the sentence as a voice.

52. The computer-readable medium as claimed in claim 49, wherein said step (b) re-transmits, to the outside, the data determined based on the input timing and the arrays of the coordinates detected in the command region when at least two of the coordinate points inside the tag region are successively detected.

53. The computer-readable medium as claimed in claim 48, wherein the first and second strokes are successively formed on the predetermined plane.

54. A computer-readable medium storing a program for performing in an information processing apparatus the steps of:
   (a) determining a command region based on a pattern of a stroke, wherein the stroke is formed by an array of points indicating coordinates input on a predetermined plane; and
   (b) transmitting data to a predetermined destination, wherein the data to be transmitted is determined based on at least one of input timing of the coordinates and the stroke, wherein:
   said step (a) comprises the steps of:
   (c) determining whether starting and end points of a first stroke are included in a closed region of a second stroke, the first and second strokes each being formed of an array of successively input coordinate points;
   (d) determining, when said step (c) determines that the starting and end points of the first stroke are included in the closed region of the second stroke, whether each of a distance between a line segment connecting the starting and end points of the first stroke and a starting point of the second stroke and a distance between a line segment connecting the starting and end points of the first stroke and an end point of the second stroke is smaller than or equal to a predetermined distance; and
   (e) determining the command region and a tag region therefor based on the first and second strokes, respectively, when said step (d) determines that each of the distances is smaller than or equal to the predetermined distance; and
   said step (b) comprises the steps of:
   (f) determining whether a stroke is included in the command region, and determining the command region to be used for command transmission when it is determined that no stroke is included in the command region;
   (g) recognizing a stroke of a predetermined shape generated inside the command region for command transmission;
   (h) converting the recognized stroke to a predetermined command corresponding thereto; and
   (i) transmitting the predetermined command to a destination of transmission specified by the tag region.

55. The computer-readable medium as claimed in claim 54, wherein the method further comprises the step of (j) presenting attribute information attached to the command region when at least one of coordinate points inside the tag region is detected.

56. The computer-readable medium as claimed in claim 55, wherein said step (j) presents the attribute information attached to the command region in the form of a sentence.

57. The computer-readable medium as claimed in claim 55, wherein said step (j) converts the attribute information attached to the command region to a sentence and outputs the sentence as a voice.

58. The computer-readable medium as claimed in claim 55, wherein said step (b) re-transmits, to the outside, the data determined based on the input timing and the arrays of the coordinates detected in the command region when at least two of the coordinate points inside the tag region are successively detected.

59. The computer-readable medium as claimed in claim 54, wherein the first and second strokes are successively formed on the predetermined plane.

* * * * *